US012786010B2

(12) United States Patent
Mayenburg

(10) Patent No.: US 12,786,010 B2
(45) Date of Patent: Nov. 3, 2026

(54) FABRIC EXPANSION PANEL INCORPORATED IN A NETWORK ELEMENT

(71) Applicant: Ciena Corporation, Hanover, MD (US)

(72) Inventor: Anthony J. Mayenburg, Ottawa (CA)

(73) Assignee: Ciena Corporation, Fulton, MD (US)

( * ) Notice: Subject to any disclaimer, the term of this patent is extended or adjusted under 35 U.S.C. 154(b) by 344 days.

(21) Appl. No.: 18/656,932

(22) Filed: May 7, 2024

(65) Prior Publication Data

US 2025/0350498 A1 Nov. 13, 2025

(51) Int. Cl.

| | |
|---|---|
| ***H04L 12/66*** | (2006.01) |
| ***H04L 12/54*** | (2022.01) |
| ***H04M 3/00*** | (2024.01) |
| ***H04M 5/00*** | (2006.01) |
| *H04L 12/70* | (2013.01) |

(52) U.S. Cl.

CPC ........ *H04L 12/56* (2013.01); *H04L 2012/561* (2013.01); *H04L 2012/5623* (2013.01)

(58) Field of Classification Search

CPC ............ G02B 6/44528; G02B 6/44526; G02B 6/3885; G02B 6/4453; G02B 6/3895; G02B 6/3825; G02B 6/4455; G02B 6/4452; G02B 6/44715; G02B 6/3893; H04Q 11/0067; H04Q 1/136; H04L 45/60; H04L 49/30; H04L 49/355; H04L 43/065; H04L 49/40; H04L 41/12; H04L 49/15; G06F 11/3006; G06F 11/3065; G06F 2113/16; G06F 30/18; G06F 30/20; G06F 30/398

See application file for complete search history.

(56) References Cited

U.S. PATENT DOCUMENTS

| | | | | |
|---|---|---|---|---|
| 8,154,867 | B2 | 4/2012 | Shearman et al. | |
| 9,203,782 | B2 | 12/2015 | Mayenburg et al. | |
| 9,603,289 | B1 | 3/2017 | Shearman et al. | |
| 10,674,241 | B2 | 6/2020 | Rivaud et al. | |
| 10,736,227 | B1 | 8/2020 | Rivaud et al. | |
| 10,924,324 | B2 * | 2/2021 | Rivaud | H04L 49/30 |
| 11,102,914 | B2 | 8/2021 | Shearman et al. | |
| 2005/0124180 | A1 | 6/2005 | Simonovich et al. | |
| 2017/0164499 | A1 | 6/2017 | Shearman et al. | |
| 2019/0327188 | A1 | 10/2019 | Rivaud et al. | |
| 2021/0210894 | A1 | 7/2021 | Rivaud et al. | |
| 2021/0239927 | A1 * | 8/2021 | Rivaud | G02B 6/4277 |

(Continued)

*Primary Examiner* — Kharye Pope

(74) *Attorney, Agent, or Firm* — Baratta Law PLLC; Lawrence A. Baratta, Jr.

(57) ABSTRACT

Systems are provided for scaling a network element without needing to re-cable line modules and fabric modules. A scalable fabric assembly includes a plurality of fabric modules, each fabric module having a plurality of ports; a plurality of line modules, each line module having a first set of ports configured to connect with the plurality of fabric modules and a second set of ports configured to connect with client equipment; and a plurality of Fabric Expansion Panels (FEPs) disposed between the plurality of fabric modules and the plurality of line modules and connected to the plurality of ports of each of the plurality of fabric modules and connected to the first set of ports, wherein each of the plurality of FEPs include internal connectivity that supports fan out between the plurality of fabric modules and the plurality of line modules based on a current stage.

20 Claims, 20 Drawing Sheets

(56) References Cited

U.S. PATENT DOCUMENTS

| | | | | |
|---|---|---|---|---|
| 2023/0010285 | A1* | 1/2023 | Rivaud ................ | G02B 6/4452 |
| 2023/0189482 | A1 | 6/2023 | Rivaud et al. | |
| 2024/0061197 | A1* | 2/2024 | Berridge .............. | G02B 6/4472 |

* cited by examiner

| Expansion Stage | Cap | # of FMs | # of LMs | cassette needed | Ramon-Jericho Port bundle | QSFP-DD port bundle | 3-stage Quantity |
|---|---|---|---|---|---|---|---|
| 1 | 102.4T | 5 | ≤ 8 | no | 32 | 4 | 40 |
| 2 | 204.8T | 10 | ≤ 16 | no | 16 | 2 | 40 |
| 3 | 409.6T | 20 | ≤ 32 | no | 8 | 1 | 40 |
| 4 | 819.2T | 40 | ≤ 64 | yes | 4 | 0.5 | 320 |
| 5 | 1638.4T | 80 | ≤ 128 | yes | 2 | 0.25 | 320 |
| 6 | 3276.8T | 160 | ≤ 256 | yes | 1 | 0.125 | 320 |

FABRIC EXPANSION PANEL INCORPORATED IN A NETWORK ELEMENT

FIELD OF THE DISCLOSURE

The present disclosure generally relates to communication networking systems. More particularly, the present disclosure relates to fabric or switching assemblies within a network component that allow for expansion as needed.

BACKGROUND

As is known, networking equipment (e.g., switches, routers, or simply network elements) are deployed to realize packet networks in various applications. It can be difficult, however, to anticipate the future needs and it does not make sense or is cost effective to deploy a network element at full scale on day one. There is typically a path to evolve or upgrade a network element, in-service, as required over time. In a packet network element, which uses cabling for interconnect between modules (instead of or with a backplane), upgrades generally include adding switch and/or line modules and re-cabling, i.e., moving cables between the existing switch and line modules to add in the new switch and/or line modules. The act of scaling (or expanding) the network element can be a complex and time-consuming task for network technicians. There is therefore a need to enable network elements to scale (or expand) as needed to handle additional traffic and also to enable such scaling in a less complex manner.

BRIEF SUMMARY

In various embodiments, the present disclosure is directed to various embodiments of scalable fabric assemblies, i.e., for a packet network element. According to one implementation, a scalable fabric assembly may be incorporated in Network Elements (NEs). The scalable fabric assembly may include multiple fabric modules, where each fabric module has multiple ports. The scalable fabric assembly further include multiple line modules, where each line module has a first set of ports configured for connection with each of the multiple fabric modules and a second set of ports configured for connection with client equipment. Furthermore, the scalable fabric assembly includes multiple Fabric Expansion Panels (FEPs) connected to the multiple ports of each of the multiple fabric modules via a first set of cables and connected to the first set of ports of each of the multiple line modules via a second set of cables. As described herein, a scale of Stage One includes a number X of fabric modules (e.g., five) and up to a number Y of line modules (e.g., eight). The multiple FEPs enable the NE to scale beyond Stage One without re-cabling the first and second sets of cables.

According to some embodiments, the scalable fabric assembly may reach a scale of Stage Two that includes 2*X fabric modules and up to 2*Y line modules. Also, a scale of Stage Three may be defined as the scalable fabric assembly having 4*X fabric modules and up to 4*Y line modules. The multiple FEPs may be configured to equally distribute the second set of ports of each of the multiple line modules to the multiple fabric modules at each of Stage One, Stage Two, and Stage Three. The number of line modules (up to the number Y) remains connected to the multiple FEPs via the second set of cables during scaling from Stage One to Stage Two. Also, a group of up to 2*Y line modules remains connected to the multiple FEPs via the second set of cables during scaling from Stage Two to Stage Three.

Moreover, the scalable fabric assembly may be configured whereby each of the multiple FEPs includes one or more replaceable cassettes enabling the NE to scale beyond Stage Three without re-cabling the first and second sets of cables. For example, a scale of Stage Four includes 8*X fabric modules and up to 8*Y line modules, a scale of Stage Five includes 16*X fabric modules and up to 16*Y line modules, and a scale of Stage Six includes 32*X fabric modules and up to 32*Y line modules. The multiple FEPs and replaceable cassettes are configured to enable the NE to scale from Stage One up to Stage Six while the NE is actively operating in a communications system and without significantly interrupting traffic during transition. In some embodiments, each of the multiple FEPs may include a first replaceable cassette and a second replaceable cassette, wherein only the first replaceable cassette is replaced while scaling from Stage Four to Stage Five, and wherein only the second replaceable cassette is replaced while scaling from Stage Five to Stage Six.

According to additional embodiments, the scalable fabric assembly may be arranged where X=5, Y=8, each of the five fabric modules includes 32 ports, and the first set of ports of each of the eight line modules includes 20 ports. Also, the line modules may be Quad Small Form-factor Pluggable (QSFP) devices. In addition, the NE may be a network node that includes a disaggregated combination of fabric modules and line modules.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

In various embodiments, the present disclosure relates to systems and methods for enabling the scaling, expansion, or upgrading of Network Elements (NEs), nodes, and/or disaggregated systems of a networking system. As mentioned above, it can be difficult to anticipate the future needs and too costly to deploy networking equipment at full scale day one. When it is determined that an existing networking system is to scale for greater traffic capabilities, the present disclosure provides fabric expansion assemblies that enable the networking system to expand in a way that reduces the number of re-cabling tasks that are normally involved with such expansion, namely reduces the need to re-cable existing modules currently present. Also, the fabric expansion assemblies of the present disclosure are configured to enable scaling the networking system to a level (or stage) that is double the capabilities of the original configuration. In an example embodiment, this doubling can be performed five times (from Stage One to Stage Six), which is $2^5$ times (or 32 times) the original scale, thus enabling multiple levels of expansion as needed as the organization grows over time. Of course, the present disclosure contemplates various scaling stages, consistent with the description presented herein. The key advantage is the fabric expansion assemblies avoid re-cabling of existing modules, so that the upgrade can be streamlined. In another embodiment, the fabric expansion assemblies include multiple cassettes that leave some connections cabled during the upgrade, so that there can be in-service support.

Network Element

A network element includes all of the physical hardware to realize a router, switch, or other type of networking device. In general, this physical hardware includes line modules which have ports for input/output to the network element, and fabric modules which provide switching of packets, amongst the line modules. In the past, network elements were formed in a chassis with a backplane, midplane, etc., i.e., where there is some fixed electrical connectivity between the modules. There are scaling issues with this approach and the trend is towards network elements with direct cabling, e.g., optical cabling, electrical cabling, etc. Also, the term disaggregated means a physical network element is formed with various modules that are physically separate, but connected to one another via cabling.

Upgrading a chassis-based network element means adding modules with more capacity, but there are fundamental limitations with the electrical backplanes, midplanes, etc. that make it difficult to scale as anticipated herewith (e.g., 32 times). To that end, direct cabling between modules allows a network element to significantly scale. The key is to adjust fan out of the line modules to a growing number of fabric modules.

Direct Cabling in Baseline Structure

Figure 1:
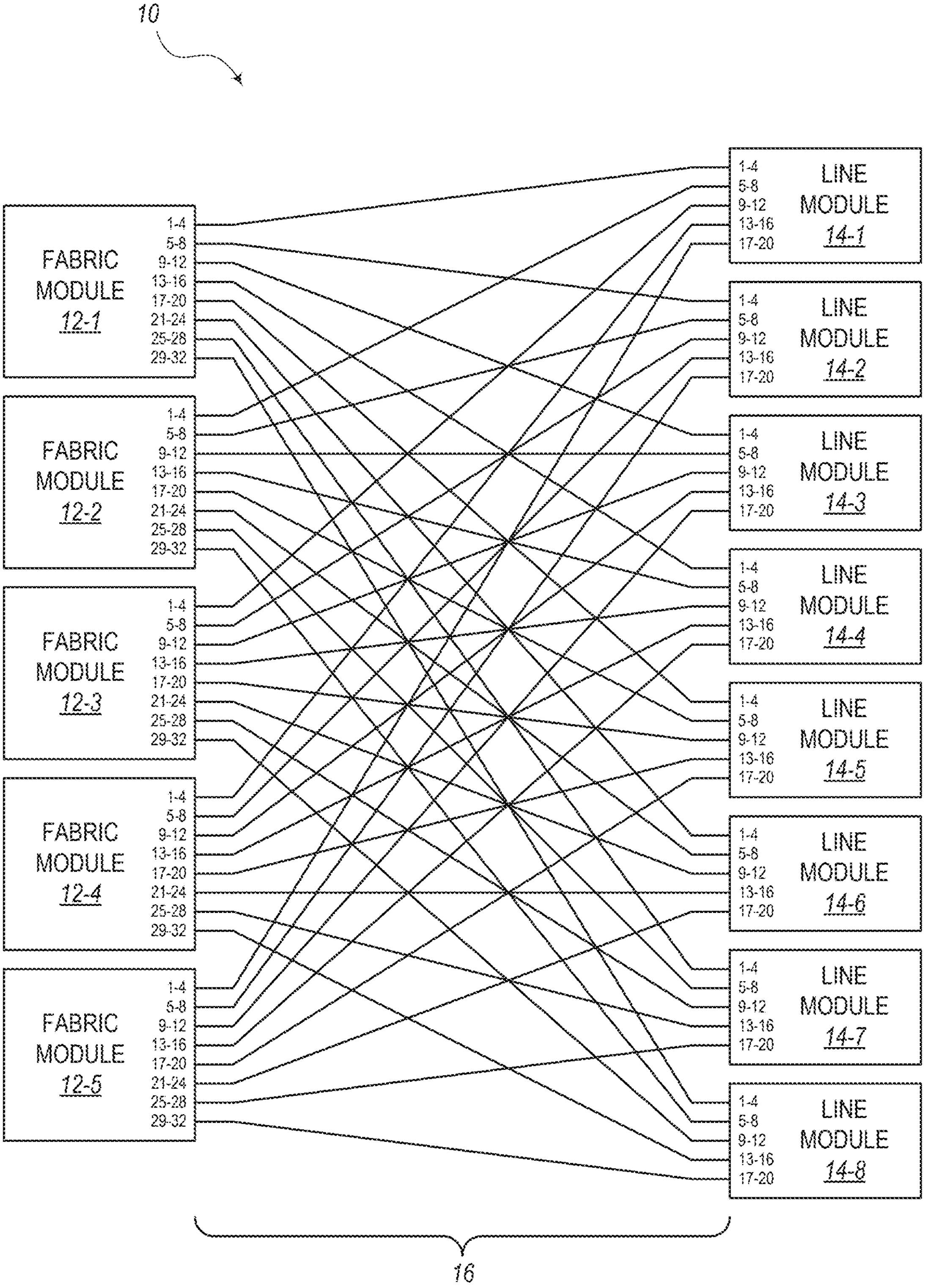
FIG. 1 is a block diagram illustrating an example of a fabric (or switching) assembly incorporated in a Network Element (NE).

FIG. 1 is a block diagram illustrating an example of a fabric assembly 10 (e.g., switching assembly, interconnection assembly, etc.) that may be incorporated in a Network Element (NE) (e.g., switch, router, etc.), which may be configured in a disaggregated arrangement. FIG. 1 and the other FIGS. herein are logical diagrams illustrating connectivity between modules. The fabric assembly 10 includes a plurality of fabric modules 12 (e.g., switch modules, fabric boxes, etc.), which include switching circuitry and ports to connect to a plurality of line modules 14. In the illustrated embodiment, the fabric assembly 10 includes five fabric modules 12-1, 12-2, 12-3, 12-4, and 12-5. Also, the fabric assembly 10 includes the plurality of line modules 14 (e.g., Quad Small Form-factor Pluggable (QSFP) modules, Input/Output (I/O) boxes, etc.), which include two sets of ports-ports to connect to the fabric modules 12 (which are the connections illustrated in FIG. 1) and ingress/egress ports used to connect to external devices (not shown in FIG. 1). In the illustrated embodiment, the fabric assembly 10 includes eight line modules 14-1, 14-2, 14-3, 14-4, 14-5, 14-6, 14-7, and 14-8. Furthermore, the fabric assembly 10 includes a plurality of links 16 (e.g., cables, fiber optic cables, etc.) for connecting high-speed ports of the fabric modules 12 with high-speed ports of the line modules 14.

Those skilled in the art will appreciate the various numbers used herein, e.g., five fabric modules 12 and eight line modules 14 are presented for illustration purposes. That is, various implementations are possible, with different values, all of which are contemplated herewith using the fabric expansion techniques of the present disclosure.

Regarding the aspect of NE being configured in a disaggregated arrangement, the NE may include modules interconnected with one another via cabling to form a single network component or node. A disaggregated NE may refer to a configuration where network functions and hardware are decoupled or separated into distinct components that can operate independently of one another, as opposed to integrated network functions and hardware are tightly coupled and provided by a single vendor. Thus, disaggregation allows the NE to be constructed by mixing and matching hardware and software elements from different vendors, which may enable greater flexibility, cost savings, innovation by allowing new software solutions to be deployed more quickly, flexibility, scalability without needing to replace the entire system, and customization by allowing an organization to tailor their network operations more closely to their specific needs by selecting the best components for each function.

As shown in FIG. 1, e.g., each fabric module 12 can include 32 ports, whereby four of these ports are connected to each of the line modules 14 via the links 16. For example, the fabric module 12-1 has four of its ports connected to ports 1-4 of each of the line modules 14-1, 14-2, . . . , 14-8. The fabric module 12-2 has four of its ports connected to ports 5-8 of each of the line modules 14-1, 14-2, . . . , 14-8. The fabric module 12-3 has four of its ports connected to ports 9-12 of each of the line modules 14-1, 14-2, 14-8. The fabric module 12-4 has four of its ports connected to ports 13-16 of each . . . , of the line modules 14-1, 14-2, . . . , 14-8. And lastly, the fabric module 12-5 has four of its ports connected to ports 17-20 of each of the line modules 14-1, 14-2, . . . , 14-8.

Furthermore, e.g., each line module 14 can include 20 ports, whereby four of these ports are connected to each of the fabric modules 14 via the links 16. For example, the line module 14-1 has four of its ports connected to ports 1-4 of each of the fabric modules 12-1, 12-2, 12-3, 12-4, 12-5. The line module 14-2 has four of its ports connected to ports 5-8 of each of the fabric modules 12-1, 12-2, 12-3, 12-4, 12-5. The line module 14-3 has four of its ports connected to ports 9-12 of each of the fabric modules 12-1, 12-2, 12-3, 12-4, 12-5. The line module 14-4 has four of its ports connected to ports 13-16 of each of the fabric modules 12-1, 12-2, 12-3, 12-4, 12-5. The line module 14-5 has four of its ports connected to ports 17-20 of each of the fabric modules 12-1, 12-2, 12-3, 12-4, 12-5. The line module 14-6 has four of its ports connected to ports 21-24 of each of the fabric modules 12-1, 12-2, 12-3, 12-4, 12-5. The line module 14-7 has four of its ports connected to ports 25-28 of each of the fabric modules 12-1, 12-2, 12-3, 12-4, 12-5. The line module 14-8 has four of its ports connected to ports 29-32 of each of the fabric modules 12-1, 12-2, 12-3, 12-4, 12-5.

Figure 2A:
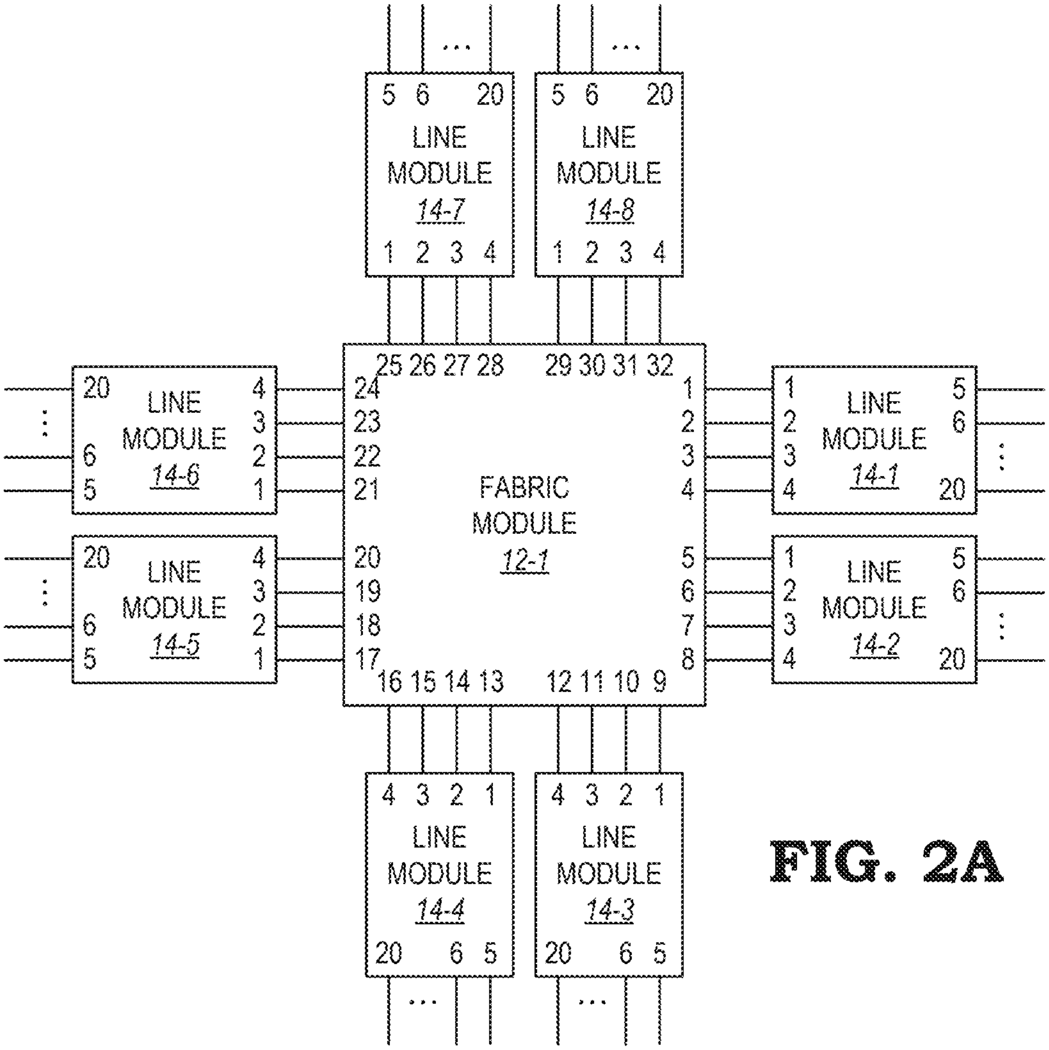
FIG. 2A is a diagram illustrating an example of port assignments for each of the fabric modules shown in FIG. 1.

FIG. 2A is a diagram illustrating an example of port assignments for each of the fabric modules 12 shown in FIG. 1. Using fabric module 12-1 as an example, four of its 32 ports are connected to ports 1-4 of each of the line modules 14. Also, regarding fabric module 12-2 (not shown in FIG. 2A), four of its 32 ports are connected to ports 5-8 of each of the line modules 14. Regarding fabric module 12-3, four of its 32 ports are connected to ports 9-12 of each of the line modules 14. Regarding fabric module 12-4, four of its 32 ports are connected to ports 13-16 of each of the line modules 14. And lastly, regarding fabric module 12-5, four of its 32 ports are connected to ports 17-20 of each of the line modules 14. Referring again to the example of fabric module 12-1 (as shown), the remaining ports (e.g., ports 5-20) of each of the line modules 14 are connected to the other fabric modules 12-2, 12-3, 12-4, 12-5.

Figure 2B:
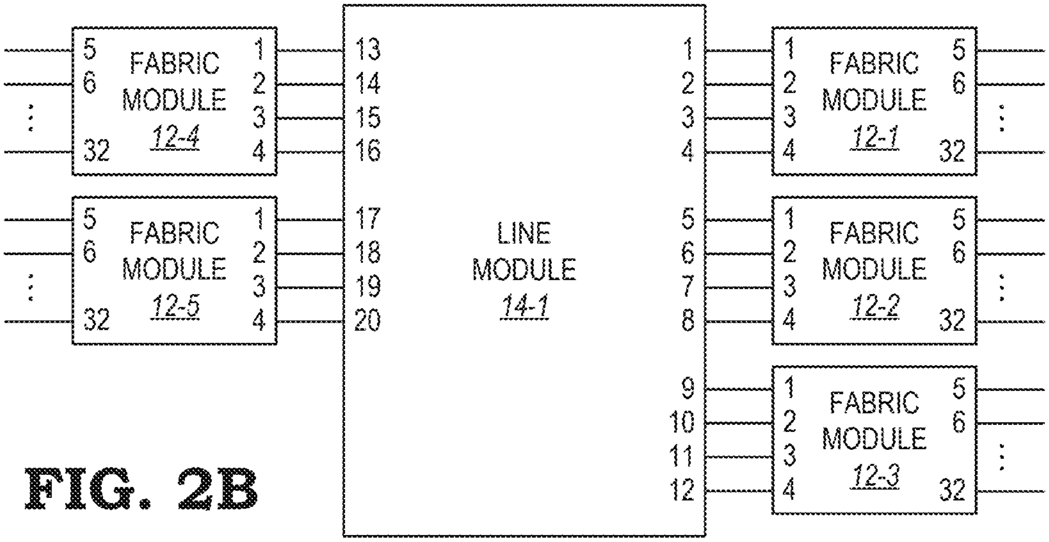
FIG. 2B is a diagram illustrating an example of port assignments for each of the line modules shown in FIG. 1.

FIG. 2B is a diagram illustrating an example of port assignments for each of the line modules 14 shown in FIG. 1. Using line module 14-1 as an example, four of its 20 ports are connected to ports 1-4 of each of the fabric modules 12. Also, regarding line module 14-2 (not shown in FIG. 2B), four of its 20 ports are connected to ports 5-8 of each of the fabric modules 12. Regarding line module 14-3, four of its 20 ports are connected to ports 9-12 of each of the fabric modules 12. Regarding fabric module 14-4, four of its 20 ports are connected to ports 13-16 of each of the fabric modules 12. Regarding line module 14-5, four of its 20 ports are connected to ports 17-20 of each of the fabric modules 12. Regarding fabric module 14-6, four of its 20 ports are connected to ports 21-24 of each of the fabric modules 12. Regarding line module 14-7, four of its 20 ports are connected to ports 25-28 of each of the fabric modules 12. And lastly, regarding line module 14-8, four of its 20 ports are connected to ports 29-32 of each of the fabric modules 12. Referring again to the example of line module 14-1, and as shown in FIG. 2B, the remaining ports (e.g., ports 5-32) of each of the fabric modules 12 are connected to the other line modules 14-2, 14-3, . . . , 14-8. Thus, when each of the line modules 14 (i.e., up to eight line modules) are connected in the system, all 20 ports are equally distributed to the fabric modules 12-1, 12-2, 12-3, 12-4, 12-5.

For scalable, disaggregated systems with separate fabric modules 12 and line modules 14 (e.g., I/O modules), in-field growth of the fabric assembly 10 (e.g., node, NE, etc.) requires adding more fabric modules 12 to the node and re-cabling the connections between the fabric modules 12 and the line modules 14 of the system in its original arrangement (as shown in FIG. 1). It should be noted that to achieve full accessibility in a disaggregated system, all line modules 14 would normally be connected to every fabric module 12 in a flat topology architecture. Therefore, when the system is to be scaled (e.g., doubling the capacity of an installed node), network technicians would normally double the number of fabric modules 12. Then, the network technicians would disconnect half of the links 16 for each line module 14 and reconnect them with the new fabric module 12. Of course, this involves moving half the line module connections from the original fabric modules 12 to the newly added fabric modules 12.

That is, the line modules 14 present need to fan out to all of the fabric modules 12 present, and adding fabric modules 12 requires re-cabling of existing line module 14 connections to accommodate the added fabric modules. The present disclosure addresses this complexity.

Scaling (Doubling) the System with Direct Cabling

Figure 3:
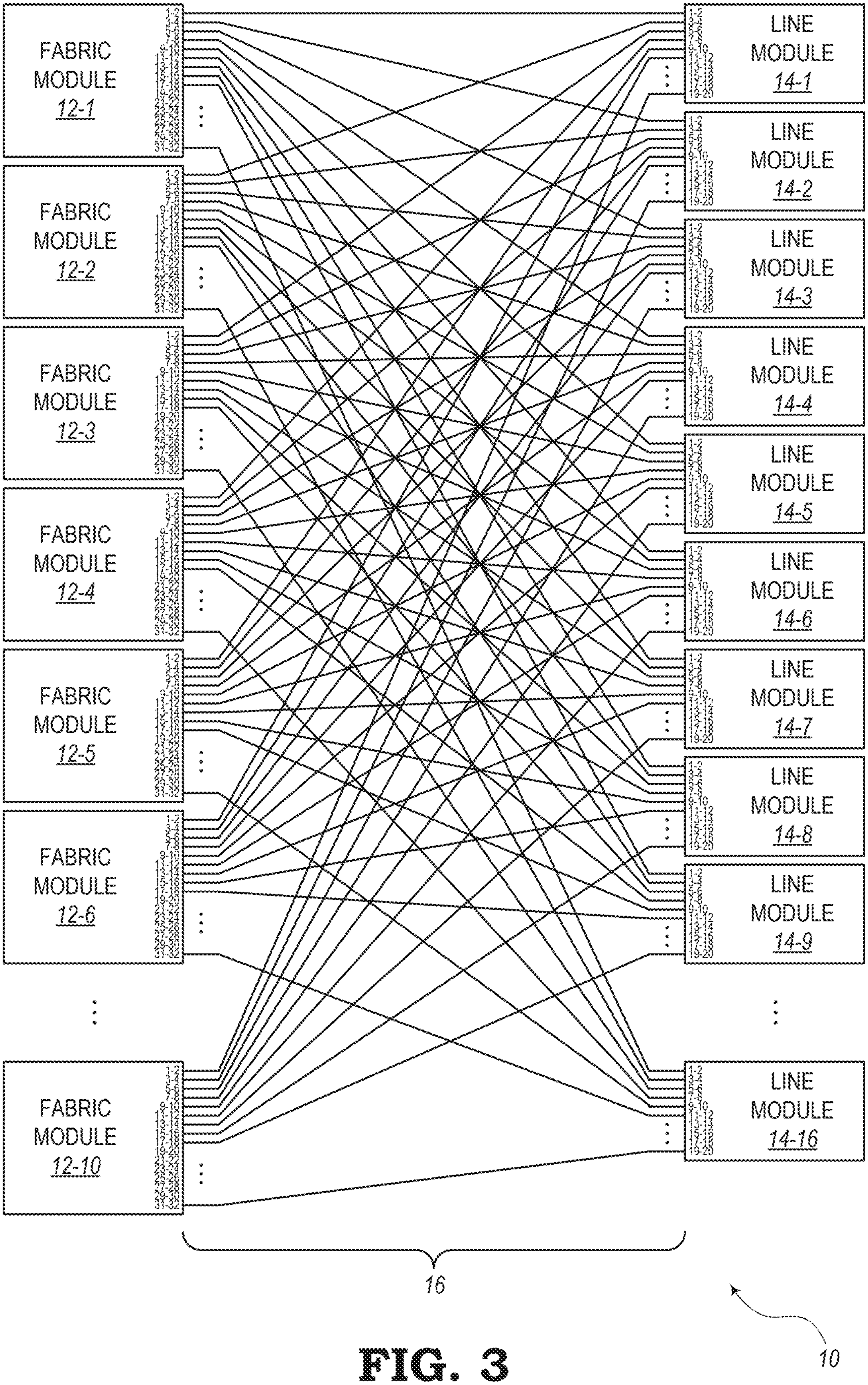
FIG. 3 is a block diagram illustrating an example of an expansion of the fabric assembly of FIG. 1 enabling the fabric assembly to accommodate double the number of line modules.

FIG. 3 is a block diagram illustrating an example of an expansion of the fabric assembly 10 of FIG. 1, enabling the fabric assembly 10 to accommodate double the number of line modules 14. Assume, for example, that the arrangement of the fabric assembly 10 shown in FIG. 1 represents a baseline size, which may be referred to as a scale of Stage One. Thus, in the Stage One scale of the fabric assembly 10, there are five fabric modules 12 and eight line modules 14. Next, FIG. 3 shows a Stage Two level, where the system is scaled such that the number of fabric modules 12 is doubled to ten. By adding five additional fabric modules 12 to the original five previously deployed, the fabric assembly 10 can then accommodate up to twice as many line modules 14 (e.g., 16 line modules 14).

As shown in FIG. 3, each of the ten fabric modules 12-1, 12-2, . . . , 12-10 still includes 32 ports. However, instead of four ports of each fabric module 12 being connected with four ports of each of the line modules 14, FIG. 3 shows the arrangement of the fabric assembly 10 where two of the ports of each fabric module 12 are connected to two of the ports of each of the line modules 14 via the links 16. For example, the fabric module 12-1 has two of its ports connected to ports 1-2 of each of the line modules 14-1, 14-2, . . . , 14-16. The fabric module 12-2 has two of its ports connected to ports 3-4 of each of the line modules 14-1, 14-2, . . . , 14-16. The fabric module 12-3 has two of its ports connected to ports 5-6 of each of the line modules 14-1, 14-2, . . . , 14-16, and so on, where the last fabric module 12-10 has two of its ports connected to ports 19-20 of each of the line modules 14-1, 14-2, . . . , 14-16.

Furthermore, each line module 14 still includes 20 ports, whereby two of these ports are connected to each of the fabric modules 14 via the links 16. For example, the line module 14-1 has two of its ports connected to ports 1-2 of each of the fabric modules 12-1, 12-2, . . . , 12-10. The line module 14-2 has two of its ports connected to ports 3-4 of each of the fabric modules 12-1, 12-2, . . . , 12-10. The line module 14-3 has two of its ports connected to ports 5-6 of each of the fabric modules 12-1, 12-2, . . . , 12-10, and so on, where the last line module 14-16 has two of its ports connected to ports 31-32 of each of the fabric modules 12-1, 12-2, . . . , 12-10.

Figure 4A:
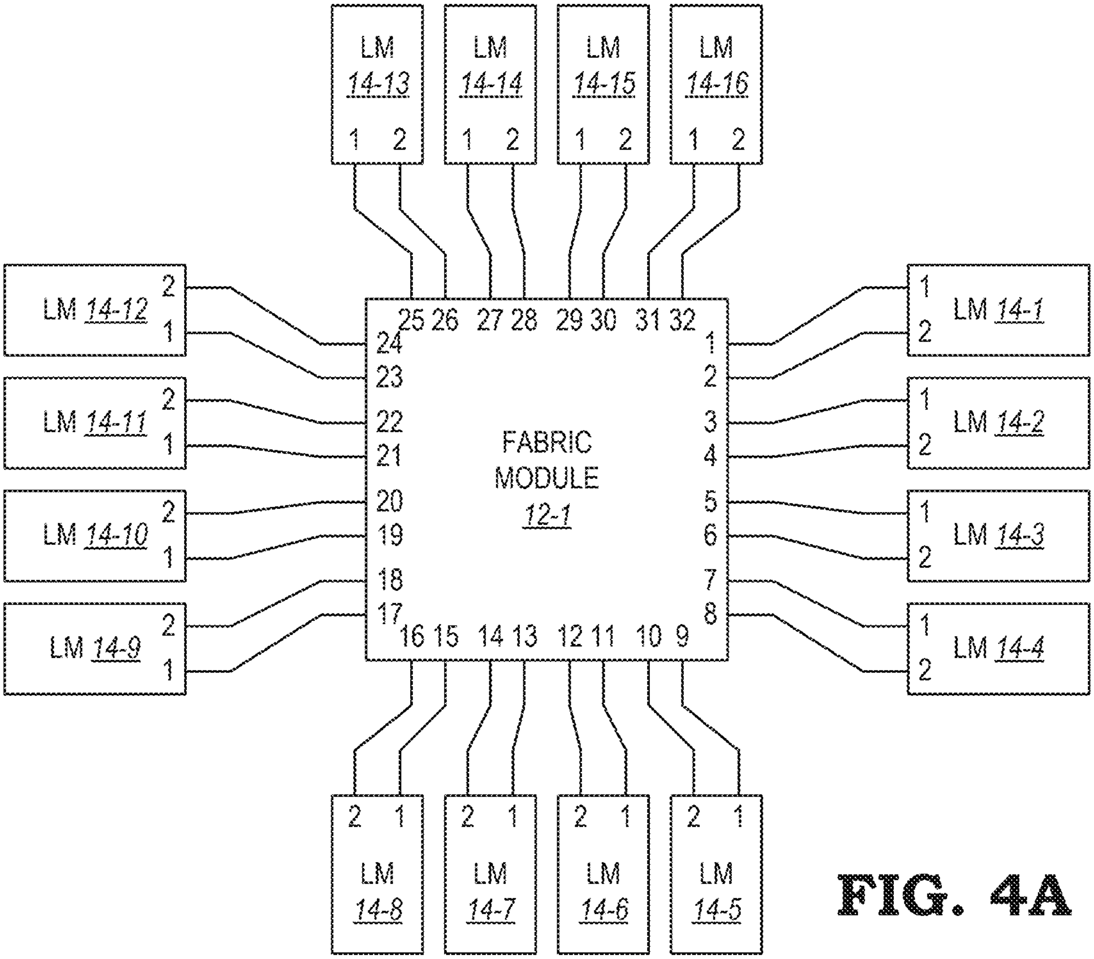
FIG. 4A is a diagram illustrating an example of port assignments for each of the fabric modules shown in FIG. 3.

FIG. 4A is a diagram illustrating an example of port assignments for each of the fabric modules 12 shown in FIG. 3. Using fabric module 12-1 as an example, two of its 32 ports are connected to ports 1-2 of each of the line modules 14. Also, regarding fabric module 12-2 (not shown in FIG. 4A), two of its 32 ports are connected to ports 3-4 of each of the line modules 14. Regarding fabric module 12-3, two of its 32 ports are connected to ports 5-6 of each of the line modules 14, and so on, where the last fabric module 12-10 has two of its 32 ports connected to ports 19-20 of each of the line modules 14. Referring again to the example of fabric module 12-1, the remaining ports (e.g., ports 3-20) of each of the line modules 14 are connected to the other fabric modules 12-2, 12-3, . . . , 12-10.

Figure 4B:
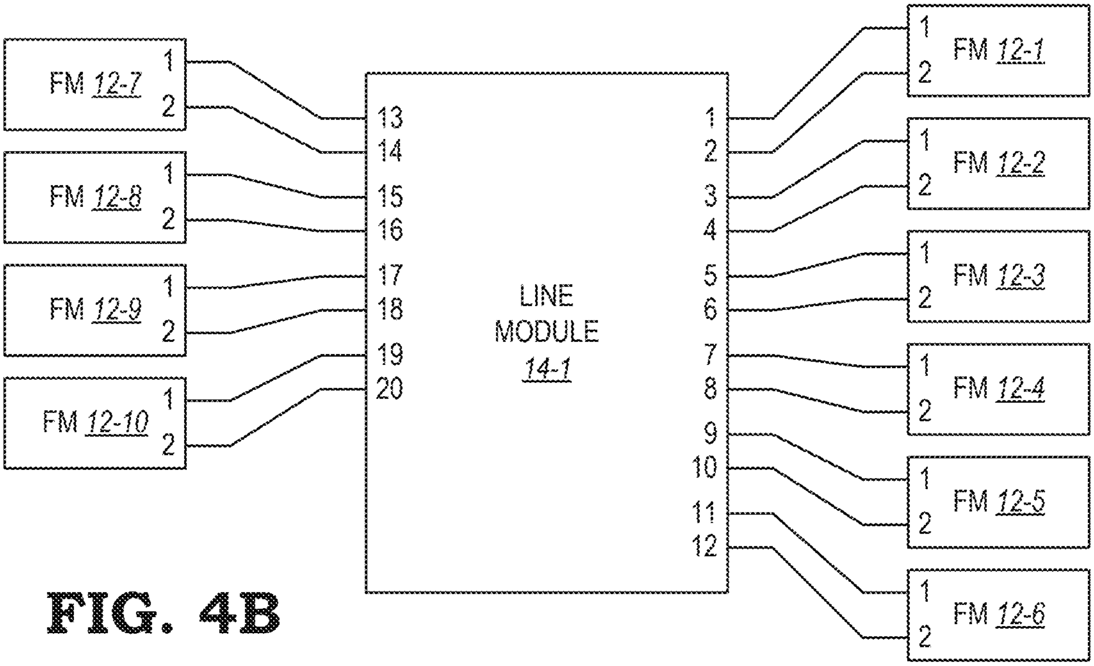
FIG. 4B is a diagram illustrating an example of port assignments for each of the line modules shown in FIG. 3.

FIG. 4B is a diagram illustrating an example of port assignments for each of the line modules 14 shown in FIG. 3. Using line module 14-1 as an example, two of its 20 ports are connected to ports 1-2 of each of the fabric modules 12. Also, regarding line module 14-2 (not shown in FIG. 2B), two of its 20 ports are connected to ports 3-4 of each of the fabric modules 12. Regarding line module 14-3, two of its 20 ports are connected to ports 5-6 of each of the fabric modules 12, and so on, where the last line module 14-16 has two of its 20 ports connected to ports 31-32 of each of the fabric modules 12. Referring again to the example of line module 14-1 (as shown), the remaining ports (e.g., ports 3-32) of each of the fabric modules 12 are connected to the other line modules 14-2, 14-3, . . . , 14-16. Thus, when each of the line modules 14 (i.e., up to sixteen line modules) are connected in the system, all 20 ports are equally distributed to the fabric modules 12-1, 12-2, . . . , 12-10.

It may be noted that the scaling of the fabric assembly 10 from Stage One (FIG. 1) to Stage Two (FIG. 3) involves the disconnection of many cables (e.g., links 16) and the reconnection of these cables with the new components. Furthermore, it may be noted that scaling the system even farther would create additional complexities.

Also, it may be noted that bundling of the cables (e.g., link 16) of FIG. 1 (i.e., where four links 16 are joined together for communication between the four ports of any fabric module 12 and the four ports of any line module 14) would prevent the connection of these four bundled cables to two different fabric modules or line modules. Therefore, the network technicians would normally be required to remove and reconnect a large number of cables, which can be structurally complex and confusing and may cause errors with respect to accurate reconnections, particularly as the system scales.

To scale from Stage One to Stage Two (or beyond) (e.g., by doubling the size with each stage), the network technicians would need to physically move half the existing cables when expanding the system capacity. The above embodiments show the use of a specific NE as an example. An installed node (e.g., fabric assembly 10) may be made up of 40 fabric boxes (or fabric modules 12) and 64 I/O boxes (or line modules 14). These boxes may be fully interconnected, where there would be no room for adding more I/O boxes. The operator may desire to double its capacity by adding 40 more fabric boxes which will enable a total of 128 I/O boxes to be connected. Following installation of the addition 40 fabric boxes (i.e., a total of 80 fabric boxes at this point), half the cables from the first 64 I/O boxes must be moved from the first 40 fabric boxes to the added fabric boxes. That is, 16 ports×40 FMs=640 cables (i.e., QSFP-DD ports containing 16 fibers per cable) would require moving. This takes time, creates service disruption, etc.

Therefore, in order to reduce the complexity of scaling a network, the present disclosure provides Fabric Expansion Panels (FEPs), which include static connectivity elements that allow expansion over multiple stages. On the other hand, a solution may be to provide Optical Connection Switches (OCSs) rather than using FEPs. With the OCSs, all fabric ports of the fabric and I/O modules are connected to OCSs. The OCSs must have enough ports to support connecting additional expansion fabric and I/O modules. When expansion occurs, the OCSs must be reconfigured.

Therefore, it may be preferable to utilize fabric assemblies, as described below, which are configured to include additional structure that simplifies the scaling of a system. By incorporating FEPs, as described herein, the fabric assemblies are able to overcome many of the shortcomings of the conventional systems. For example, by requiring network technicians to move many cables (hundreds or even thousands of cables) to grow a system, the network technicians would need to identify which cables require moving to a new fabric module.

Also, the network technicians would need to determine if each of the to-be-moved cables have sufficient length to reach from the original I/O module to the new fabric module it needs to connect to after system expansion. The network technicians may need to replace cables that are too short and/or too long and may need to deal with slack management for cables that are too long.

The network technicians would also need to disconnect each cable one at a time and withdraw the cable through any fiber management structures in order to move them to their new location, which of course can be a complex and time-consuming operation. By using OCSs instead of FEPs, the conventional systems may utilize MEMS devices, which can be more expensive and may require additional space and power. Although the OCSs may offer any port to any port connectivity, this capability may not be required for many types of fabric expansion projects.

Therefore, by incorporating the FEPs into a fabric assembly, as described in more detail below, the present disclosure is configured to allow a one-time connection of fabric modules and line modules into the FEPs. Then, when new equipment is added, the new equipment is simply connected to additional ports on the FEPs. Therefore, there is little or no re-cabling required with the novel FEPs described herein.

The FEPs may include a separate housing or module which may have internal cabling set up based on each stage of expansion. One advantage is that the fabric modules and line modules are statically cabled to the FEP and do not require re-cabling. Also, as the number of fabric modules and line modules is expanded, the network technician may simply replace the FEP with a new module that fans out the cabling as appropriate, again without requiring re-cabling. Furthermore, the FEPs may be configured where they include a static portion for supporting the cabling to the fabric modules and line modules, whereby one or more cassettes can be inserted in the FEPs, the cassettes configured to support the internal cabling arrangements between the fabric modules and line modules. In some embodiments, each FEP may include two (or more) cassettes, whereby, to upgrade from one stage to the next (e.g., doubling the number of fabric modules), the network technicians may simply replace just one of the cassette while the other (or others) may include connectivity that would work with both stages and would not need to be replaced, with the remaining cassette providing some level of connectivity during the upgrade process. It may be noted some connectivity may be consistent from one stage to the next, thereby allowing the system to continue to operate (e.g., at 50% or greater capacity) during transition.

Fabric Expansion Panels (FEPs)

Figure 5:
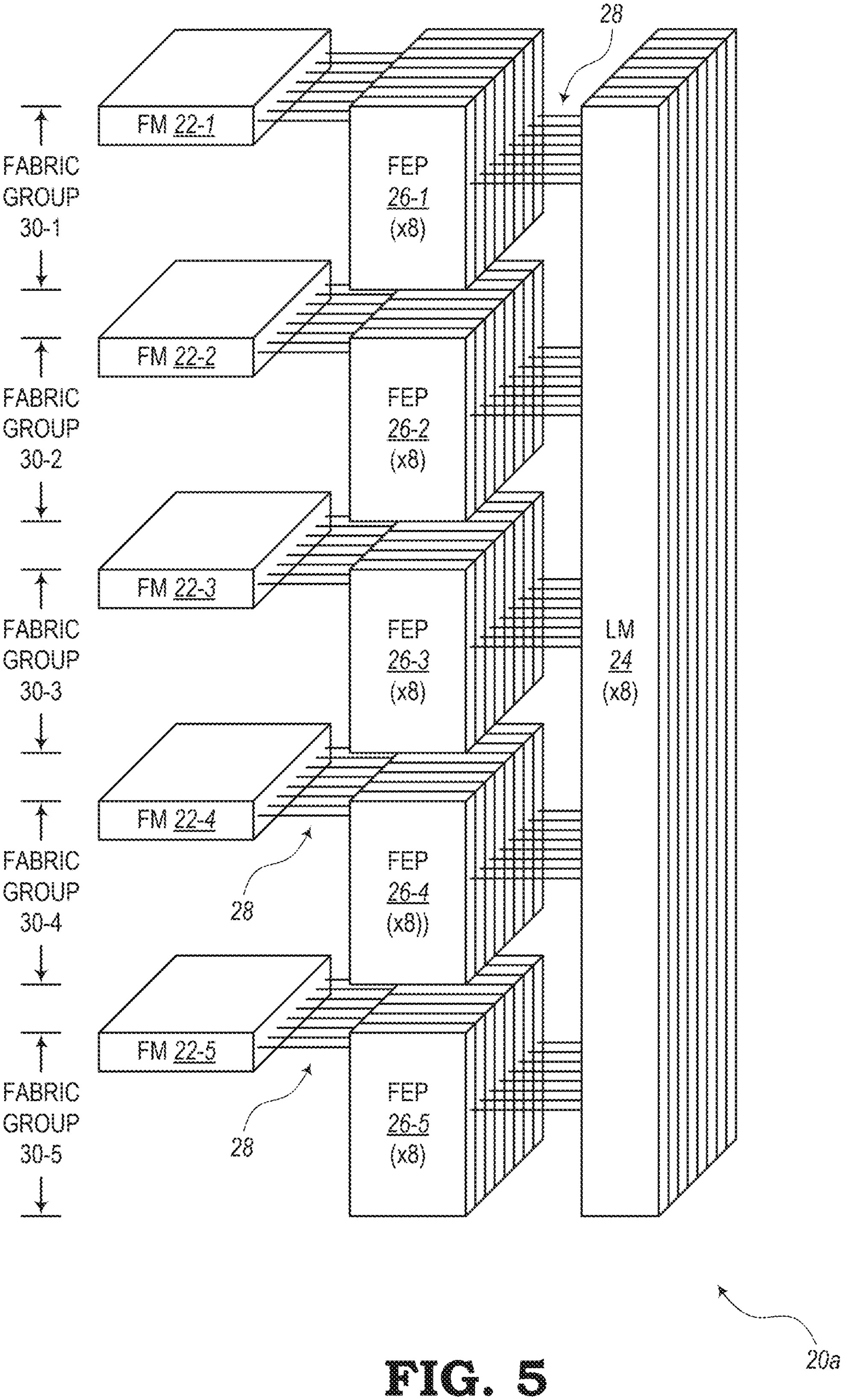
FIG. 5 is a block diagram illustrating a fabric (or switching) assembly incorporated in a NE, the fabric assembly set up at minimum scale (Stage One) allowing for expansion as needed, according to various embodiments of the present disclosure.

FIG. 5 is a block diagram illustrating an embodiment of a fabric assembly 20*a* (e.g., fabric, switching assembly, switching matrix, interconnection system, etc.) incorporated in a NE. As shown, the fabric assembly 20*a* is set up at a minimum scale (Stage One) allowing for expansion as needed. The fabric assembly 20*a*, according to the embodiment of FIG. 5, includes a plurality of Fabric Modules (FMs) 22-1, 22-2, 22-3, 22-4, 22-5 and a plurality of Line Modules (LMs) 24. In FIG. 5, the fabric assembly 20*a* at Stage One is configured to accommodate up to eight LMs 24. According to various embodiments, the fabric assembly 20*a* may include any number of FMs 22 and LMs 24.

The fabric assembly 20*a* also includes a plurality of Fabric Expansion Panels (FEPs) connected between the FMs 22 and LMs 24. A first set of FEPs 26-1 (e.g., eight FEPs) is connected between FM 22-1 and each of the LMs 24. A second set of FEPs 26-2 (e.g., eight FEPs) is connected between FM 22-2 and each of the LMs 24. A third set of FEPs 26-3 (e.g., eight FEPs) is connected between FM 22-3 and each of the LMs 24. A fourth set of FEPs 26-4 (e.g., eight FEPs) is connected between FM 22-4 and each of the LMs 24. A fifth set of FEPs 26-5 (e.g., eight FEPs) is connected between FM 22-5 and each of the LMs 24. According to various embodiments, the number of sets of FEPs 26 may be equal to the number of FMs 22 in Stage One (e.g., five) and the number of FEPs 26 in each set may be equal to the number of LMs 24 in Stage One (e.g., eight). Therefore, as shown, the fabric assembly 20*a* includes 40 (i.e., 5×8) FEPs in this embodiment.

A plurality of links 28 (e.g., optical cables) are used for connecting the FMs 22 with the FEPs 26 and for connecting the LMs 24 to the FEPs 26. In this embodiment, eight links 28 are used for connecting FM 22-1 to the eight FEPs in the first set of FEPs 26-1, eight links 28 are used for connecting FM 22-2 to the eight FEPs in the second set of FEPs 26-2, eight links 28 are used for connecting FM 22-3 to the eight FEPs in the third set of FEPs 26-3, eight links 28 are used for connecting FM 22-4 to the eight FEPs in the fourth set of FEPs 26-4, and eight links 28 are used for connecting FM 22-5 to the eight FEPs in the fifth set of FEPs 26-5. In addition, five links 28 are used for connecting each LM 24 to a corresponding FEP in each of the sets of FEPs 26-1, 26-2, 26-3, 26-4, 26-5. Therefore, in this embodiment, there is a first set of 40 links 28 connected between the FMs 22 and the FEPs 26 and there is a second set of 40 links 28 connected between the LMs 24 and the FEPs 26.

In this embodiment, the first FM 22-1 and the first set of FEPs 26-1 are included in a first fabric group 30-1. The second FM 22-2 and the second set of FEPs 26-2 are included in a second fabric group 30-2. The third FM 22-3 and the third set of FEPs 26-1 are included in a third fabric group 30-3. The fourth FM 22-4 and the fourth set of FEPs 26-4 are included in a fourth fabric group 30-4. And lastly, the fifth FM 22-5 and the fifth set of FEPs 26-5 are included in a fifth fabric group 30-5. The LMs 24 are connected across all fabric groups 30-1, 30-2, 30-3, 30-4, 30-5.

Generally, the FEPs 26 are passive devices with external ports that connect to the FMs 22 and to the LMs 24, and with internal connectivity which provides the correct fan out between the FMs 22 and the LMs 24 for a given stage of expansion. The objective is to avoid having to re-cable the existing FMs 22 and LMs 24 to upgrade, but rather add the new FMs 22 and/or LMs 24 to the FEP 26, and upgrade the internal connectivity, such as via cassettes or the like. FIGS. 5-11 focus on the network element level showing how it scales with the FEPs 26, whereas FIGS. 12-20 focus on the internal connectivity of the FEPs 26 to support this scaling. Again, those skilled in the art will appreciate the values of ports, FMs, LMs, FEPs, etc. are all presented for illustration purposes, and the present disclosure contemplated various different implementations. Since the FEPs 26 are passive devices, they can be deployed day one, without significant cost, but with significant benefit in allowing upgrades in a greatly reduced manner.

Scaling with FEPs

Figure 6:
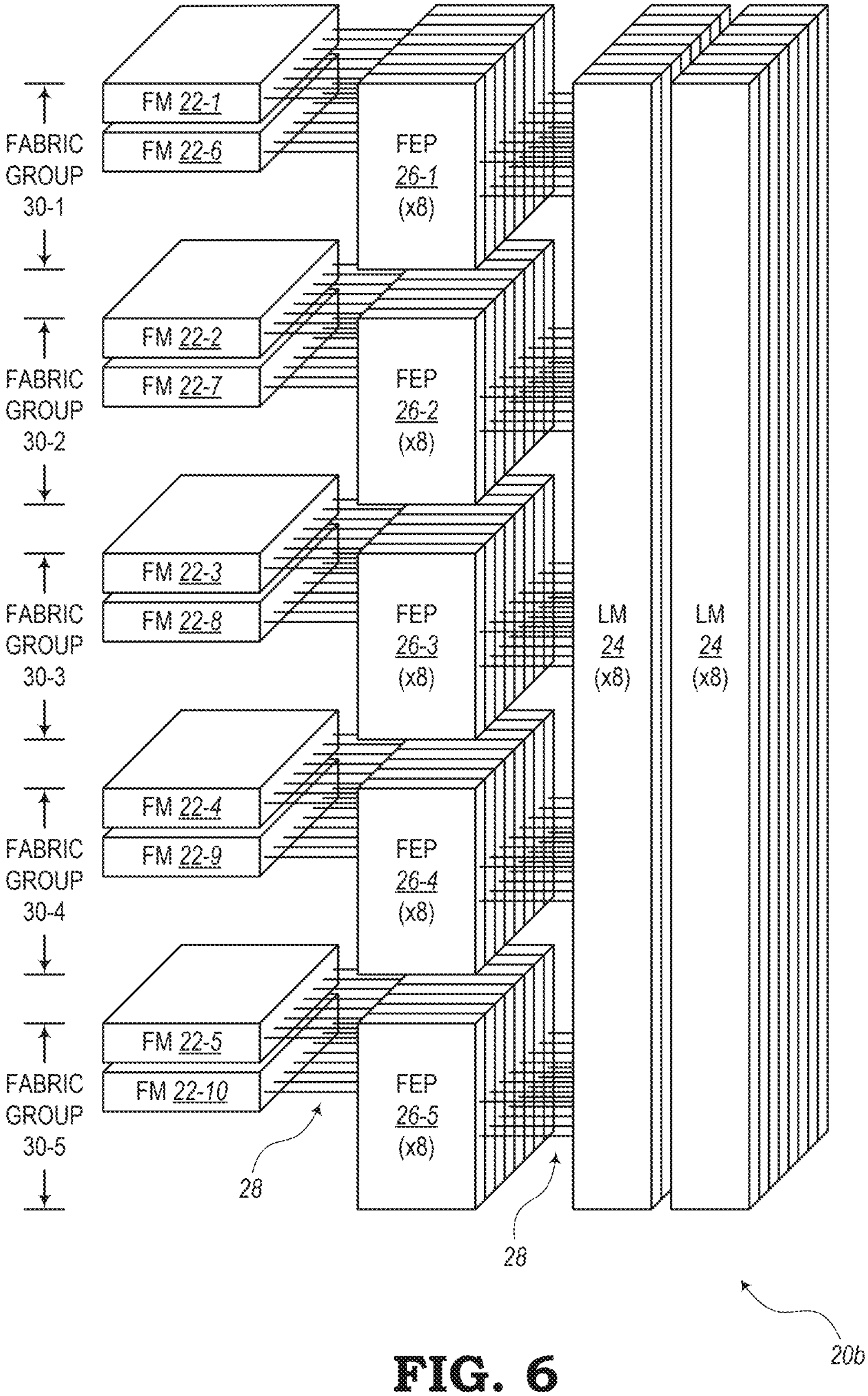
FIG. 6 is a block diagram illustrating a fabric assembly scaled up from the fabric assembly of FIG. 5 to an expanded scale (Stage Two), according to various embodiments.

FIG. 6 is a block diagram illustrating a fabric assembly 20*b* that is an expansion of the fabric assembly 20*a* of FIG. 5. The fabric assembly 20*b* represents the NE being scaled up from a Stage One level (FIG. 5) to an expanded (doubled) scale, which is referred to herein as a Stage Two level. In addition to the same elements shown in FIG. 5, the fabric assembly 20*b* further includes FMs 22-6, 22-7, 22-8, 22-9, 22-10 and a second set of eight LMs 24. In this embodiment, FM 22-6 is added to the first fabric group 30-1, FM 22-7 is added to the second fabric group 30-2, FM 22-8 is added to the third fabric group 30-3, FM 22-9 is added to the fourth fabric group 30-4, and FM 22-10 is added to the fifth fabric group 30-5. No new FEPs 26 are added in Stage Two.

In the embodiment of FIG. 5, the fabric assembly 20*a* at Stage One is configured to accommodate up to eight LMs 24. However, when the number of FMs 22 are doubled in FIG. 6, the fabric assembly 20*b* at Stage Two is configured to accommodate up to sixteen LMs 24. Again, according to various embodiments, the fabric assembly 20*b* may include any number of FMs 22 and LMs 24 and may be double the number of FMs 22 and LMs 24 used in the embodiment of FIG. 5.

The first set of eight FEPs 26-1 is connected between FMs 22-1, 22-6 and each of the sixteen LMs 24. The second set of eight FEPs 26-2 is connected between FMs 22-2, 22-7 and each of the sixteen LMs 24. The third set of eight FEPs 26-3 is connected between FMs 22-3, 22-8 and each of the sixteen LMs 24. The fourth set of eight FEPs 26-4 is connected between FMs 22-4, 22-9 and each of the sixteen LMs 24. The fifth set of eight FEPs 26-5 is connected between FMs 22-5, 22-10 and each of the sixteen LMs 24.

A plurality of additional links 28 are used for connecting the new FMs 22-6, 22-7, 22-8, 22-9, 22-10 with unused ports of the corresponding FEPs 26. As new LMs 24 are added to the system, additional links 28 are also used for connecting the second set of LMs 24 to unused ports of the FEPs 26. In this embodiment, eight links 28 are used for connecting FM 22-6 to the unused ports of the eight FEPs in the first set of FEPs 26-1, eight links 28 are used for connecting FM 22-7 to the unused ports of the eight FEPs in the second set of FEPs 26-2, eight links 28 are used for connecting FM 22-8 to the unused ports of the eight FEPs in the third set of FEPs 26-3, eight links 28 are used for connecting FM 22-9 to the unused ports of the eight FEPs in the fourth set of FEPs 26-4, and eight links 28 are used for connecting FM 22-10 to the unused ports of the eight FEPs in the fifth set of FEPs 26-5. In addition, five links 28 are used for connecting each new LM 24 to the unused port of a corresponding FEP in each of the sets of FEPs 26-1, 26-2, 26-3, 26-4, 26-5. Therefore, in this embodiment, there is an additional set of 40 links 28 connected between the new FMs 22-6, 22-7, . . . , 22-10 and the FEPs 26 and there is another additional set of 40 links 28 connected between the new LMs 24 and the FEPs 26.

Advantageously, this upgrade from Stage One to Stage Two does not require any re-cabling of the FMs 22-1, . . . , 22-5 or the first set of LMs 24. Rather, only the new FIMs 22-6, . . . , 22-10 and the second set of LMs 24 are cabled to existing ports on the FEPs 26.

Further Scaling with FEPs

Figure 7:
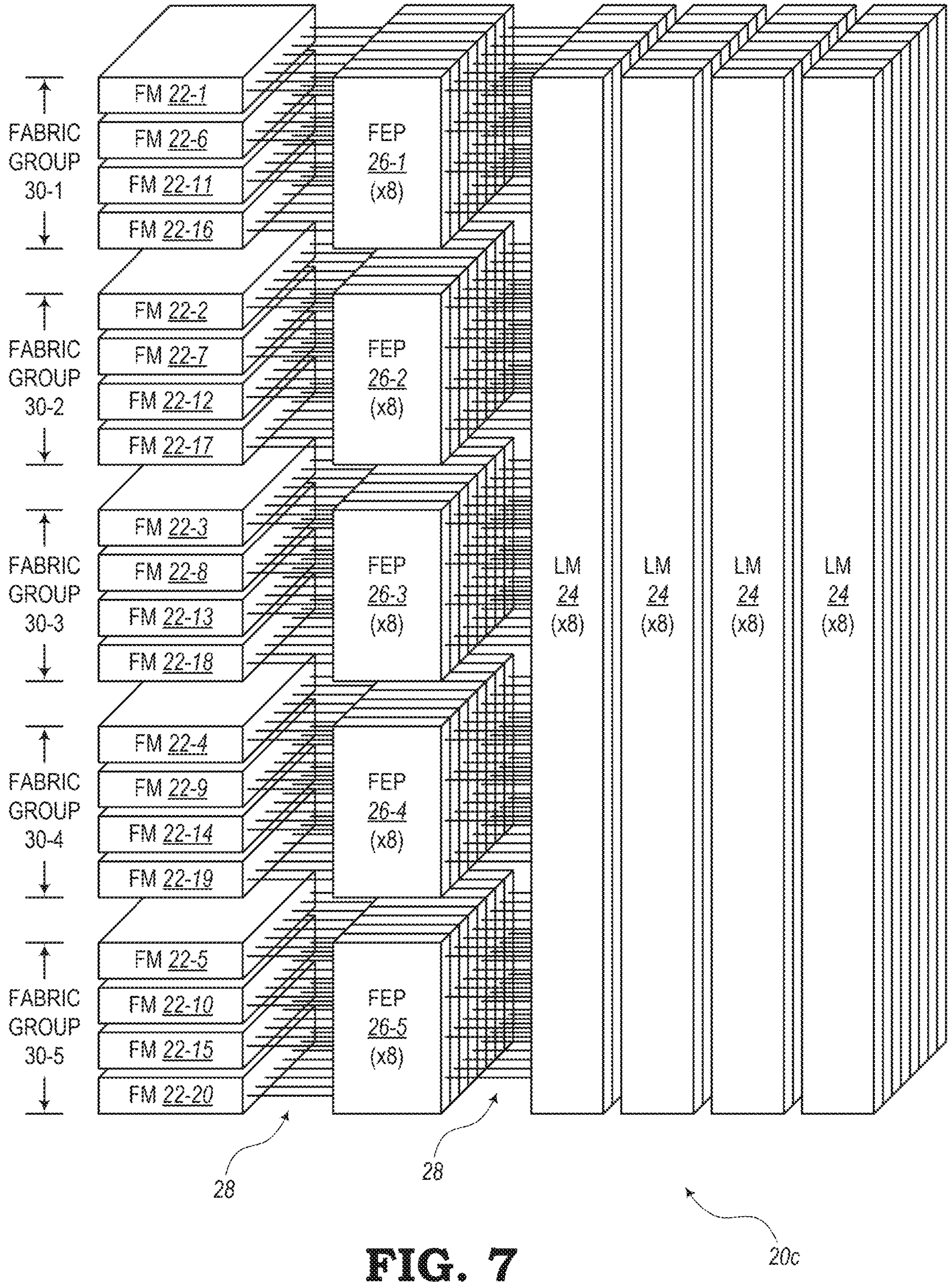
FIG. 7 is a block diagram illustrating a fabric assembly scaled up from the fabric assembly of FIG. 6 to an expanded scale (Stage Three), according to various embodiments.

FIG. 7 is a block diagram illustrating a fabric assembly 20*c* that is an expansion of the fabric assembly 20*b* of FIG. 6. The fabric assembly 20*c* represents the NE being scaled up from Stage Two (FIG. 6) to an expanded (doubled) scale, which is referred to herein as a Stage Three level. In addition to the same elements shown in FIG. 6, the fabric assembly 20*c* further includes FMs 22-11, 22-12, . . . , 22-20 and third and fourth sets of LMs 24 (eight each). In this embodiment, FMs 22-11, 22-16 are added to the first fabric group 30-1, FMs 22-12, 22-17 are added to the second fabric group 30-2, FMs 22-13, 22-18 are added to the third fabric group 30-3, FMs 22-14, 22-19 are added to the fourth fabric group 30-4, and FMs 22-15, 22-20 are added to the fifth fabric group 30-5. Again, no new FEPs 26 are added in Stage Three.

In the embodiment of FIG. 6, the fabric assembly 20*b* at Stage Two is configured to accommodate up to sixteen LMs 24. However, when the number of FMs 22 are doubled in FIG. 7, the fabric assembly 20*c* at Stage Three is configured to accommodate up to 32 LMs 24. Again, according to various embodiments, the fabric assembly 20*c* may include any number of FMs 22 and LMs 24 and may be double the number of FMs 22 and LMs 24 used in the embodiment of FIG. 6.

The first set of eight FEPs 26-1 is connected between FMs 22-1, 22-6, 22-11, 22-16 and each of the 32 LMs 24. The second set of eight FEPs 26-2 is connected between FMs 22-2, 22-7, 22-12, 22-17 and each of the 32 LMs 24. The third set of eight FEPs 26-3 is connected between FMs 22-3, 22-8, 22-13, 22-18 and each of the 32 LMs 24. The fourth set of eight FEPs 26-4 is connected between FMs 22-4, 22-9, 22-14, 22-19 and each of the 32 LMs 24. The fifth set of eight FEPs 26-5 is connected between FMs 22-5, 22-10, 22-15, 22-20 and each of the 32 LMs 24.

A plurality of additional links 28 are used for connecting the new FMs 22-11, 22-12, . . . , 22-20 with unused ports of the corresponding FEPs 26. As new LMs 24 are added to the system, additional links 28 are also used for connecting the third and fourth sets of LMs 24 to unused ports of the FEPs 26. In this embodiment, eight links 28 are used for connecting each of FMs 22-11, 22-16 to the unused ports of the eight FEPs in the first set of FEPs 26-1, eight links 28 are used for connecting each of FMs 22-12, 22-17 to the unused ports of the eight FEPs in the second set of FEPs 26-2, eight links 28 are used for connecting each of FMs 22-13, 22-18 to the unused ports of the eight FEPs in the third set of FEPs 26-3, eight links 28 are used for connecting each of FMs 22-14, 22-19 to the unused ports of the eight FEPs in the fourth set of FEPs 26-4, and eight links 28 are used for connecting each of FMs 22-15, 22-20 to the unused ports of the eight FEPs in the fifth set of FEPs 26-5. In addition, five links 28 are used for connecting each new LM 24 of the third and fourth sets of LMs 24 to the unused port of a corresponding FEP in each of the sets of FEPs 26-1, 26-2, 26-3, 26-4, 26-5. Therefore, in this embodiment, there is an additional set of 80 links 28 connected between the new FMs 22-11, 22-12, . . . , 22-20 and the FEPs 26 and there is another additional set of 80 links 28 connected between the new sets of LMs 24 and the FEPs 26.

With the FEPs arranged between the FMs 22 and LMs 24 as shown, scaling (e.g., doubling) the size of the NE does not require removal, re-cabling, and/or reconnection of any of the original 80 links 28 of this initial equipment. During system expansion, additional FMs 22 and LMs 24 may be added and connected to unused ports of the FEPs 26 without removal of the previously connected links 28. In some embodiments, as described below with respect to FIGS. 10-20, the FEPs 26 may contain replaceable cassette modules (e.g., fiber modules) that can be replaced as a unit when the system is expanded (doubled).

The physical design of the FEPs 26 facilitates bundling of cables (e.g., lines 28) to simplify the connection with the FMs 22 and LMs 24. For example, each link 28 illustrated in FIG. 5 may represent a bundle of cables (e.g., 4 cables, 8 cables, 16 cables, 32 cables, etc.). In this way, the links 28 can form "trunk" cables to reduce the number of cables that must be installed. "Ganging" of multiple FEPs 26 into a larger array that shares a common replaceable cassette module is configured to reduce the number of maintenance actions required to perform an expansion upgrade. For example, if FEPs 26 are organized into an 8×FEP array (as shown), a system with 320 FEPs 26 may require 40 maintenance actions to replace cassette modules upon a system upgrade, whereas a conventional upgrade may instead include 320 maintenance actions.

Figure 8:
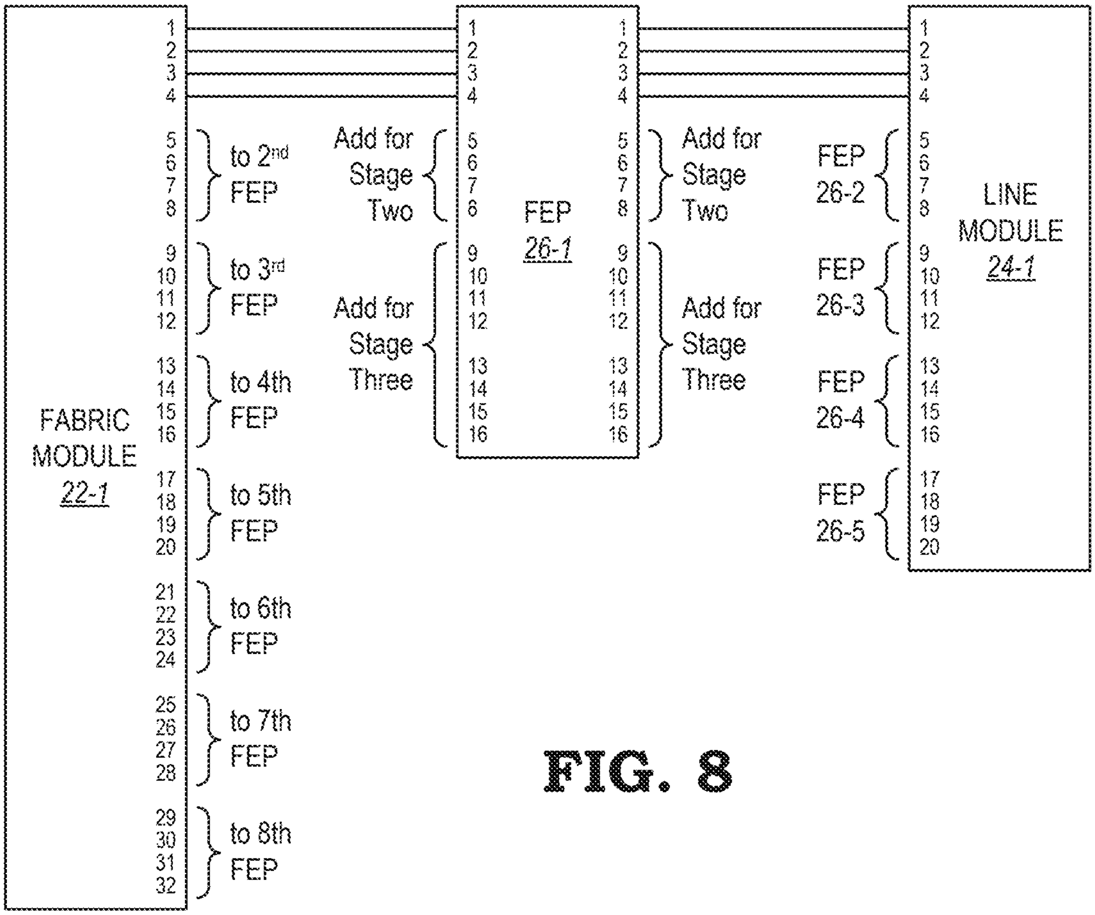
FIG. 8 is a block diagram illustrating port assignments for the use of the Fabric Expansion Panels (FEPs) shown in FIGS. 5-7 arranged between the fabric modules and line modules, according to various embodiments.

FIG. 8 is a block diagram illustrating an embodiment of port assignments for the use of the FEPs 26 shown in FIGS. 5-7 arranged between the fabric modules (FMs) 22 and line modules (LMs) 24. As shown in FIGS. 5-7, each link 28 is represented by a single line. However, as shown in FIG. 8, each link may include four cables (e.g., optical fibers) connected between four ports on the FM 22 and four ports on the FEP 26 (and between four ports on the LM 24 and four ports on the FEP 26). For example, FM 22-1 has ports 1-4 connected to fabric-facing ports 1-4 of FEP 26-1 and LM 24-1 has ports 1-4 connected to client-facing ports 1-4 of FEP 26-1. Ports 5-8 of FM 22-1 are connected to four ports of the second FEP in the first set of FEPs 26-1, ports 9-12 are connected to four ports of the third FEP in the first set of FEPs 26-1, and so on. Also, ports 5-8 of the LM 24-1 are connected to four client-facing ports of the corresponding FEP in the second set of FEPs 26-2, ports 9-12 are connected to four ports of the corresponding FEP in the third set of FEPs 26-3, and so on.

As can be seen in FIG. 8, the first FEP in the first set of FEPs 26-1 includes fabric-facing ports 1-4 and client-facing ports 1-4 in Stage One. Ports 5-16 of each FEP in each set of FEPs 26 include unused ports 5-16 on both the fabric side and the client side during use in Stage One. When expanded to Stage Two, ports 5-8 on both sides of the FEP 26 are used to double the size of the fabric with respect to Stage One. When expanded to Stage Three, ports 9-16 on both sides of the FEP 26 are used to double the size of the fabric with respect to Stage Two (i.e., four times the size of Stage One).

Figure 9:
FIG. 9 is a table illustrating parameters of Stages One through Six regarding the expansion or scaling of a NE, where Stages Four through Six include the use of a cassette, according to various embodiments.

FIG. 9 is a table 35 illustrating parameters of Stage One through Stage Six regarding the expansion or scaling of a NE, where Stages Four through Six include the use of a cassette, as described below with respect to FIGS. 10-20 according to various example embodiments. Again, those skilled in the art will appreciate the values here, and in the previous figures are merely for illustration purposes and not limiting, i.e., those skilled in the art will recognize other values are contemplated. In this example, the table 35 includes a cap regarding the amount of data (in Terabits) that can be transported. Also, the table 35 shows the number of FMs and LMs that may be included in the NE, based on the examples described above in which five FMs and eight LMs are used in an initial configuration (Stage One). Also, as described above, the first three expansion stages (i.e., Stages One through Three) are possible without an additional cassette. In this scenario, each port on each FM and LM is used to the fullest in Stage Three. Therefore, to extend beyond Stage Three, in this example, cassette modules may be used according to the embodiments described below.

Again, those skilled in the art will recognize these embodiments are merely presented for illustration purposes and not meant to limit the disclosure to these specific values. Additionally, QSFP-DD is just one type of optical module, for illustration purposes as well. The present disclosure can use any type of module for interconnect and is not limited to QSFP-DD.

Further Scaling

Figure 10:
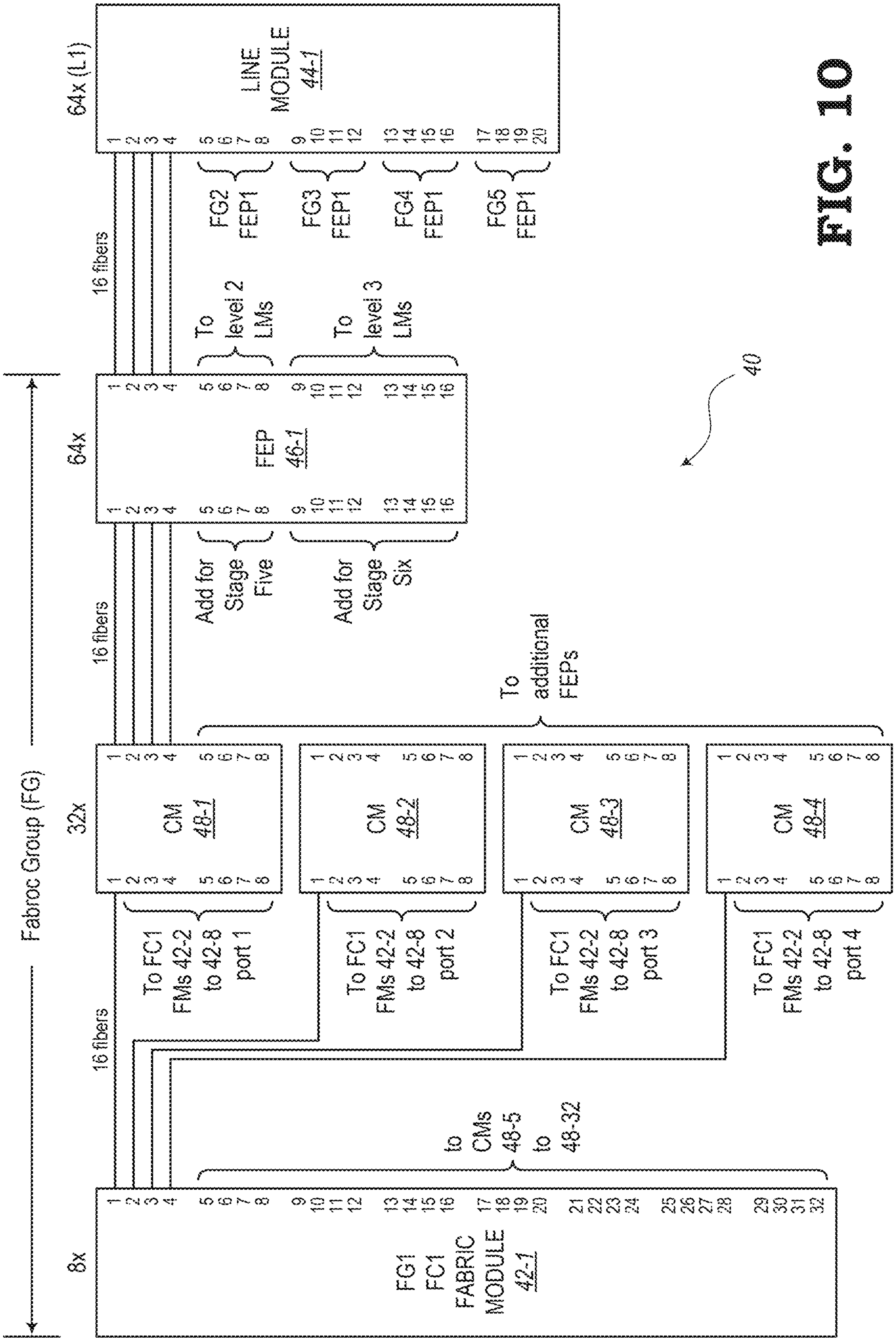
FIG. 10 is a block diagram illustrating port assignments for a fabric assembly including the use of Cassette Modules (CMs) for expansion to Stages Four through Six, according to various embodiments.

FIG. 10 is a block diagram illustrating an embodiment of port assignments for another fabric assembly 40. As shown, the fabric assembly 40 includes many of the elements of previous embodiments for enabling Stage One through Stage Three expansion. For example, the fabric assembly 40 includes a plurality of sets of Fabric Modules (FMs) 42, a plurality of sets of Line Modules (LMs) 44, and a plurality of sets of Fabric Expansion Panels (FEPs) 46. In addition, the fabric assembly 40 includes the use of a plurality of sets of Cassette Modules (CMs) 48 or fabric modules, which can enable expansion to Stage Four through Stage Six, according to various embodiments. In one embodiment, the fabric assembly 40 may include 32 CMs 48, where CMs 48-1, 48-2, 48-3, 48-4 are shown.

Figure 11:
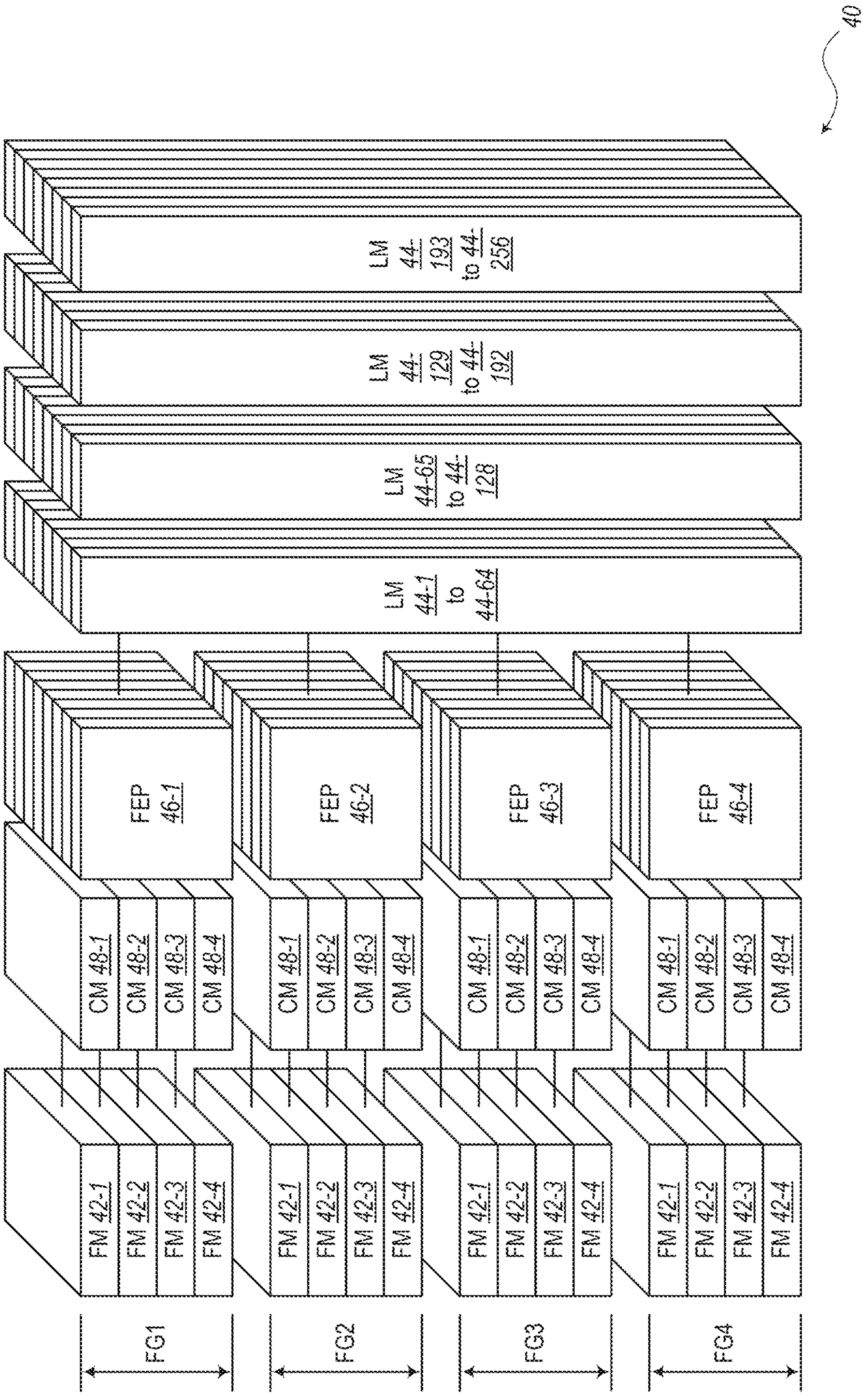
FIG. 11 is a block diagram illustrating a fabric assembly scaled up to Stage Six, according to various embodiments.

FIG. 11 is a block diagram illustrating an embodiment of the fabric assembly 40 of FIG. 10, scaled up to Stage Six to enable up to 256 LMs 44. The CMs 48 may be configured as replaceable blind mate cassettes with unique fiber connectivity to effectively modify the end-to-end fiber optic cable connectivity between FMs 42 and LMs 44. Again, the fabric assembly 40 may be part of a disaggregated system, NE, network node, etc., where there is no need to move cables connected between the FMs 42 and LMs 44. The CMs 48 are associated with the FEPs 46 and are configured as replaceable cassettes that perform the changes or movements in the logical connectivity. In this way, the links or cables (i.e., a first set of optical fiber cables between the FMs 42 and the CMs 48, a second set of optical fiber cables between the CMs 48 and FEPs 46, and a third set of optical fiber cables between the FEPs 46 and the LMs 44) can be bundled into larger trunk cables, which reduces the number of cables in the system and thereby simplifies the physical connection actions in the system.

Cassette Modules (CM)

FIGS. 12 to 20 are various logical diagrams illustrating internal connectivity within an individual FEP module, consistent with the examples described herein. Each FEP module includes various ports, shown in FIGS. 12 to 20 on the left and right side, and internal connectivity between the power. Also, the term Cassette Module (CM) is used to refer to a removable module that can be included between the ports, to redirect fan out based on the current Stage. That is, the CMs are changeable based on an upgrade. The net effect of the CMs is it allows the FMs and LMs to remain cabled to the ports and changes the fan out of existing FMs and LMs accordingly.

Figure 12:
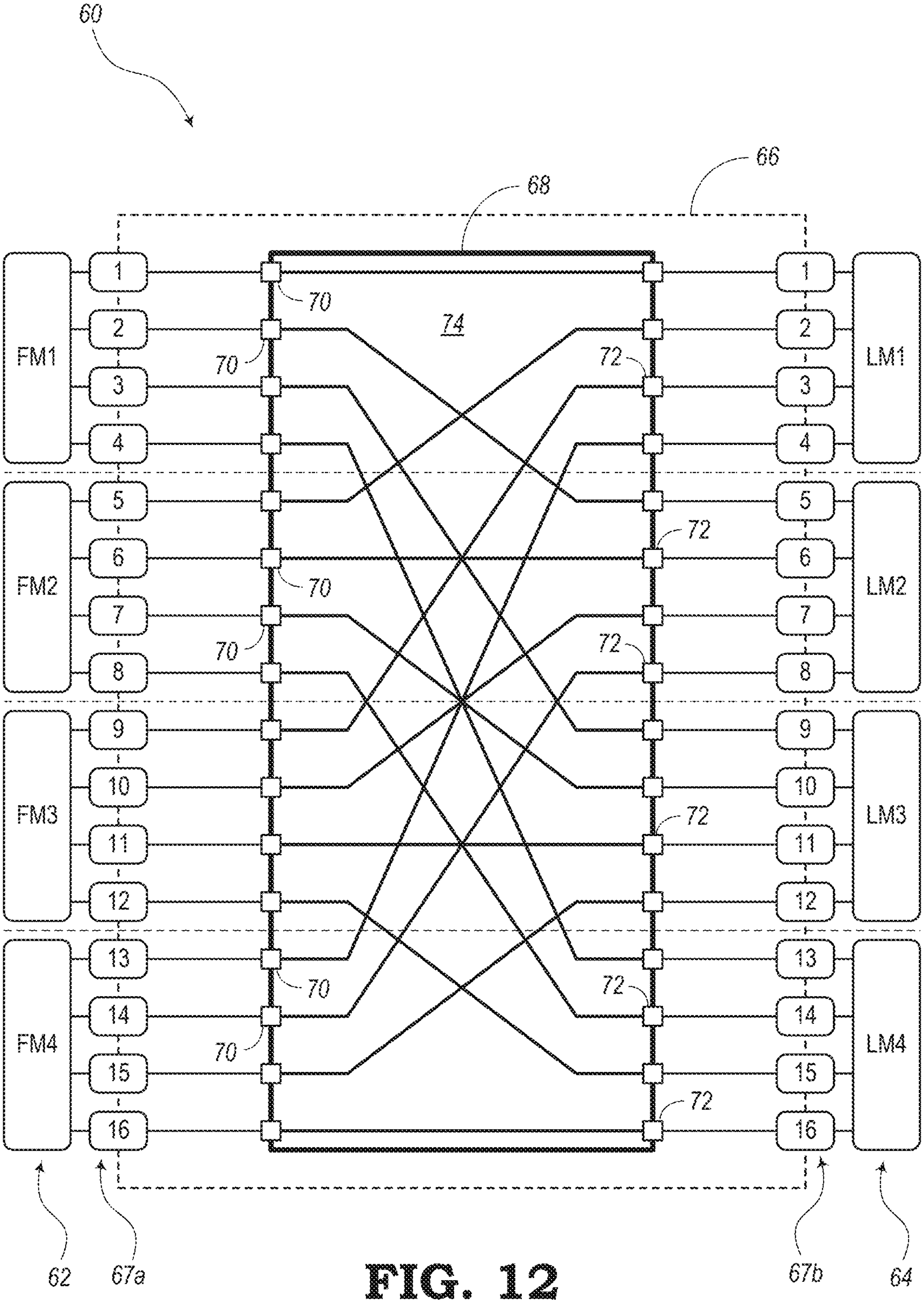
FIG. 12 is a diagram illustrating a FEP having a cassette module arranged between fabric modules and line modules, according to various embodiments.

FIG. 12 is a diagram illustrating an embodiment of a fabric configuration 60 arranged between a plurality of FMs 62 (e.g., FM1, FM2, FM3, FM4) and a plurality of LMs 64 (e.g., LM1, LM2, LM3, LM4). The fabric configuration 60 includes an FEP 66 having a plurality of fabric-facing ports 67*a*, a plurality of line-facing ports 67*b*, and a replaceable Cassette Module (CM) 68 interconnected between the fabric-facing ports 67*a* and line-facing ports 67*b*. A first set of internal ports 70 are directly connected to the fabric-facing ports 67*a* and a second set of Internal ports 72 are directly connected to the line-facing ports 67*b*. The first and second sets of internal ports 70, 72 enable the CM 68 to be removably connected in the system and may be replaced with a different CM as needed for scaling.

The CM 68 includes an internal pathway arrangement 74 that connects the first set of internal ports 70 to the second set of internal ports 72 in a predefined configuration. In some embodiments, the connectivity or internal pathway arrangement 74 may be symmetrical. That is, each pathway from a specific internal port 70 to a specific internal port 72 connects a specific fabric-facing port 67*a* to a specific line-facing port 67*b*, such as, for example, in a symmetrical manner. For example, in this embodiment, the pathway from port #3 of the fabric-facing ports 67*a* leads to port #9 of the line-fabric ports 67*b*, and, in addition, the pathway from port #3 of the line-fabric ports 67*b* leads to port #9 of the fabric-facing ports 67*a* in the other direction. Therefore, although FIG. 12 shows the FMs 62 on one side (e.g., left side of page) and the LMs 64 on the other (e.g., right side of page), the symmetry of the internal pathway arrangement 74 allows the FMs 62 and LMs 64 to be reversed.

In this embodiment, the CM 68 has an internal pathway arrangement 74 configured to connect 16 different ports of the first set of internal ports 70 to 16 different ports of the second set of internal ports 72. However, in some embodiments, as described below, certain pathways may bypass the CM and directly connect the fabric-facing ports 67*a* to the line-facing ports 67*b*. It should be noted that the internal pathway arrangement 74 connects the FMs 62 and LMs 64 in a way that might be used with a Stage Six scale, where all available connections are utilized.

Figure 13:
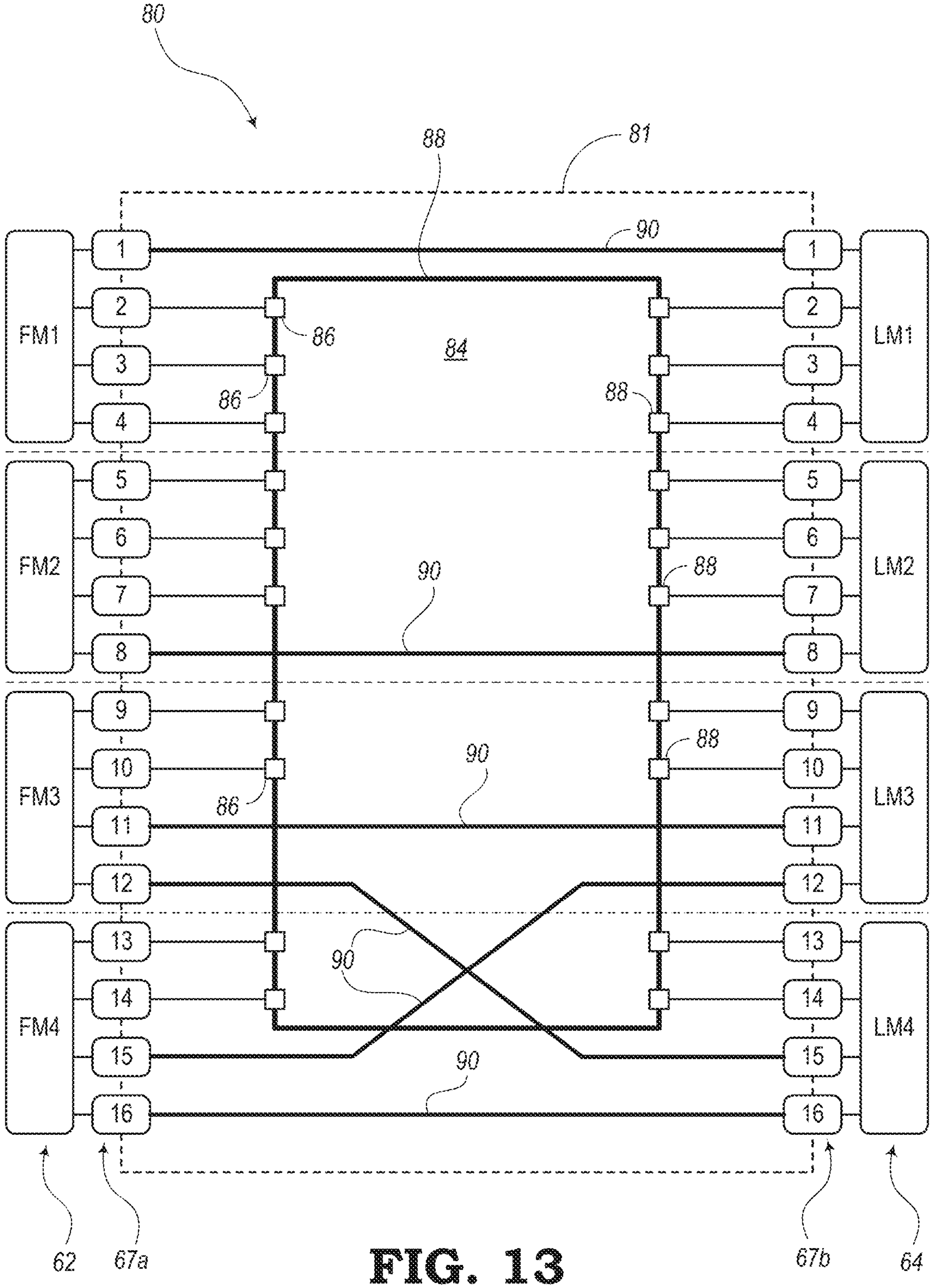
FIG. 13 is a diagram illustrating a FEP having bypass links and a template of a cassette module arranged between fabric modules and line modules enabling scaling of an NE or node, according to various embodiments of the present disclosure.

FIG. 13 is a diagram illustrating an embodiment of a fabric configuration 80 arranged between the plurality of FMs 62 (e.g., FM1, FM2, FM3, FM4) and the plurality of LMs 64 (e.g., LM1, LM2, LM3, LM4). The fabric configuration 80 includes an FEP 81 having a plurality of fabric-facing ports 67*a*, a plurality of line-facing ports 67*b*, and a replaceable Cassette Module (CM) 88 interconnected between the fabric-facing ports 67*a* and line-facing ports 67*b*. The CM 88 in this embodiment is simply a template without any pathways in an internal pathway arrangement 84. A first set of internal ports 86 are directly connected to the fabric-facing ports 67*a* and a second set of Internal ports 88 are directly connected to the line-facing ports 67*b*. The first and second sets of internal ports 86, 88 enable the CM 88 to be removably connected in the system and may be replaced with a different CM as needed for scaling.

Instead of 16 ports in the first set of internal ports 70 and 16 ports in the second set of internal ports 72 (as described with respect to FIG. 12), the fabric configuration 80 of FIG. 13 shows that the FEP 81 includes 10 different ports in the first set of internal ports 86 and 10 different ports in the second set of internal ports 88. In addition, the FEP 81 includes six different bypass pathways 90 directly connecting some of the fabric-facing ports 67*a* to some of the line-facing ports 67*b* while bypassing the CM 88. It may be noted that no ports 86, 88 are thereby needed where the CM 88 is bypassed. From this template plus the bypass pathways 90, the fabric configuration 80 shows how pathways can be added to the internal pathway arrangement 84 of other CMs to create various connectivity configurations for Stage Four through Stage Six. Thus, additional CMs, as described below, are configured to enable achieving different scales (i.e., Stage Four to Stage Six).

Figure 14:
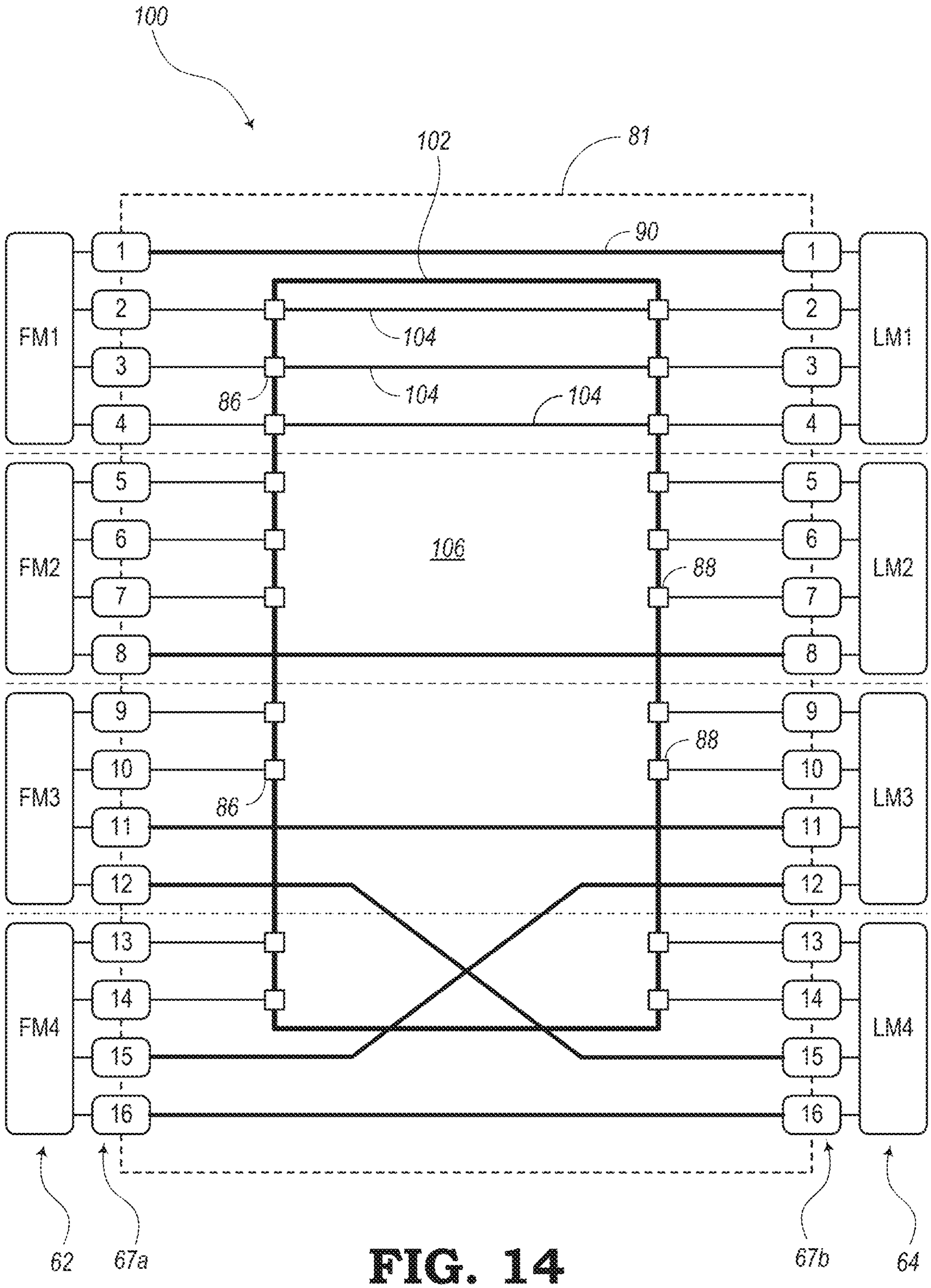
FIG. 14 is a diagram illustrating a FEP having the bypass links shown in FIG. 13 and a cassette module arranged for Stage Four expansion, according to various embodiments.

FIG. 14 is a diagram illustrating an embodiment of a fabric configuration 100 arranged between the plurality of FMs 62 (e.g., FM1, FM2, FM3, FM4) and the plurality of LMs 64 (e.g., LM1, LM2, LM3, LM4). The fabric configuration 100 includes the FEP 81 having the plurality of fabric-facing ports 67*a*, the plurality of line-facing ports 67*b*, and a CM 102 interconnected between the fabric-facing ports 67*a* and line-facing ports 67*b* configured for Stage Four operation. In this arrangement, the CM 102 includes three pathways 104 configured to connect three specific ports of the first set of internal ports 86 corresponding to ports #2, #3, and #4 of the fabric-facing ports 67*a* associated with FM1 to three specific ports of the second set of internal ports 88 corresponding to ports #2, #3, and #4 of the line-facing ports 67*b* associated with LM1. Thus, with these three pathways 104 plus the existing passthrough 90 from port #1 associated with FM1 to port #1 associated with LM1, four ports of FM1 are connected with four ports of LM1 for Stage One operation. The other passthroughs 90 are irrelevant in Stage Four operation but may be used for scaling to Stage Five or Stage Six as needed. If it is determined that the system is to be scaled to a greater traffic handling capability, the CM 102 can be removed and a new CM, as described in FIG. 15, can be inserted. It may be noted that even with the CM 102 removed, some traffic may still be enabled over the passthrough 90 (connecting the #1 ports) until the new one can be installed.

Again, the CM 102 includes an internal pathway arrangement 106 that connects the first set of internal ports 86 to the second set of internal ports 88 in a predefined configuration. In some embodiments, the connectivity or internal pathway arrangement 106 may be symmetrical. That is, each pathway from a specific internal port 86 to a specific internal port 88 connects a specific fabric-facing port 67*a* to a specific line-facing port 67*b*, such as, for example, in a symmetrical manner. For example, in this embodiment, the pathway 104 from port #2 of the fabric-facing ports 67*a* leads to port #2 of the line-fabric ports 67*b*, a second pathway 104 from port #3 of the line-fabric ports 67*b* leads to port #3 of the fabric-facing ports 67*a*, and a third pathway 104 from port #4 of the line-fabric ports 67*b* leads to port #4 of the fabric-facing ports 67*a*. Therefore, although FIG. 14 shows the FMs 62 on one side (e.g., left side of page) and the LMs 64 on the other (e.g., right side of page), the symmetry of the internal pathway arrangement 106 allows the FMs 62 and LMs 64 to be reversed.

Figure 15:
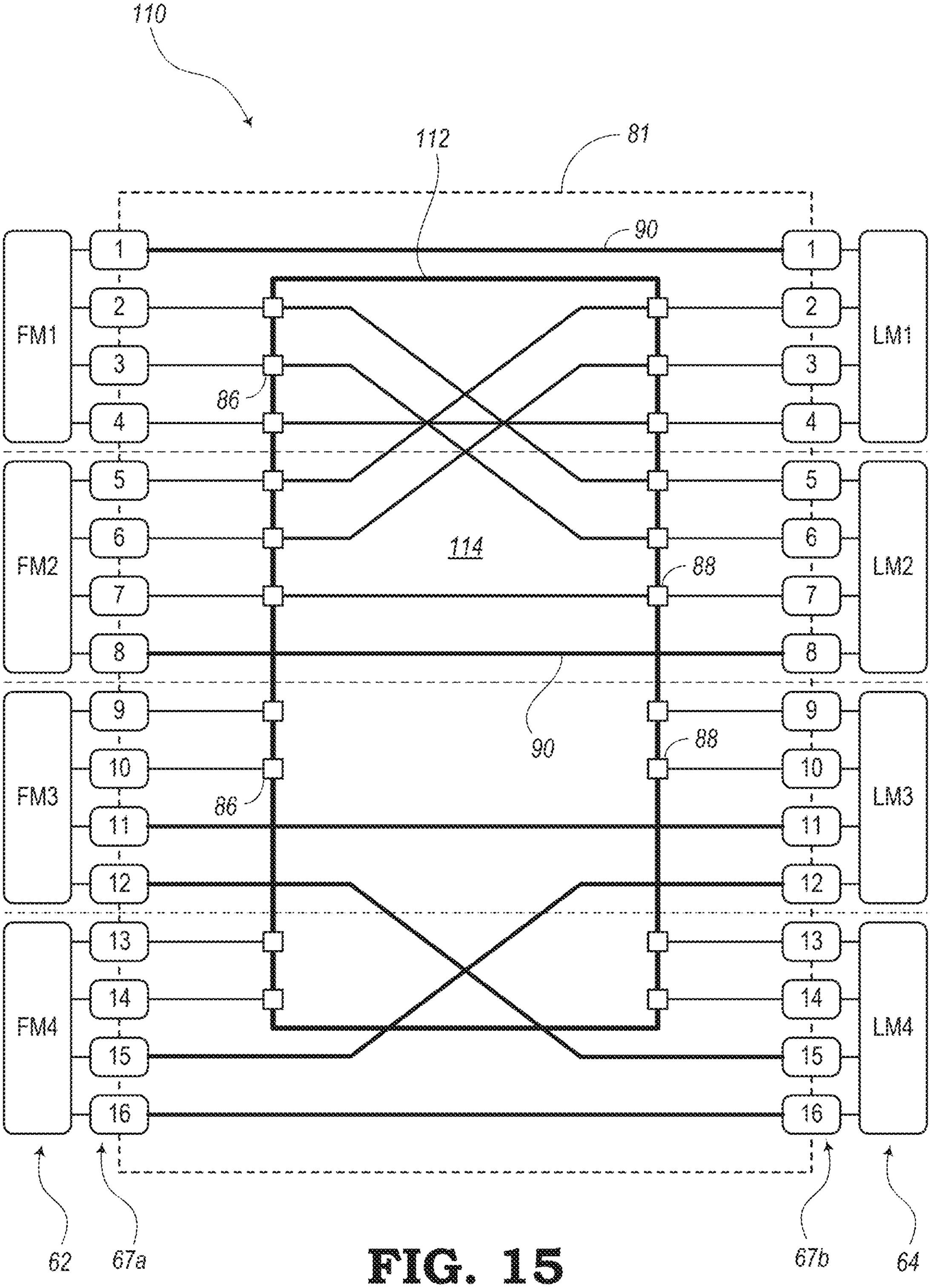
FIG. 15 is a diagram illustrating a FEP having the bypass links shown in FIG. 13 and a cassette module arranged for Stage Five expansion, according to various embodiments.

FIG. 15 is a diagram illustrating an embodiment of a fabric configuration 110 arranged between the plurality of FMs 62 and the plurality of LMs 64. The fabric configuration 110 includes the FEP 81 having the plurality of fabric-facing ports 67*a* and the plurality of line-facing ports 67*b* and is arranged with a CM 112 interconnected between the fabric-facing ports 67*a* and line-facing ports 67*b* configured for Stage Four operation. In this arrangement, the CM 112 includes an internal pathway arrangement 114 where six pathways are configured to connect these six specific ports of the first set of internal ports 86 corresponding to ports #2 through #7 of the fabric-facing ports 67*a* associated with FM1 and FM2 to six specific ports of the second set of internal ports 88 corresponding to ports #2 through #7 of the line-facing ports 67*b* associated with LM1 and LM2.

Thus, with these pathways of the internal pathway arrangement 114 (plus a first existing passthrough 90 from port #1 associated with FM1 to port #1 associated with LM1 and a second existing passthrough 90 from port #8 associated with FM2 to port #8 associated with LM2), the eight ports of FM1 and FM 2 are connected with the eight ports of LM1 and LM2 in a distributed fashion for Stage Five operation. For example, the distributed connection between the FMs 62 and LMs 64 includes an arrangement where two ports 67*a* of FM1 (#1 and #4) are connected to LM1 and two ports 67*a* (#2 and #3) are connected to LM2. Also, the arrangement is such that two ports 67*a* of FM2 (#5 and #6) are connected and FM1 and two ports 67*a* (#7 and #8) are connected to LM2.

The other three passthroughs 90 are irrelevant with respect to Stage Five, but may be used for scaling to Stage Six as needed. If it is determined that the system is to be scaled to a greater traffic handling capability, the CM 112 can be removed and a new CM, as described in FIG. 16, can be inserted. It may be noted that even with the CM 112 removed, some traffic may still be enabled over the passthrough 90 (connecting the #1 and #8 ports) until the new one can be installed. Six of the connections are pathways associated with the CM 112, while two connections are passthroughs 90. Again, even if it is determined that further expansion is needed and the system is to scale to Stage Six and when the CM 112 is removed, the system still has the two passthroughs 90 allowing for some traffic during transition.

Again, the CM 112 includes an internal pathway arrangement 114 that connects the first set of internal ports 86 to the second set of internal ports 88 in a predefined configuration. In some embodiments, the connectivity or internal pathway arrangement 114 may be symmetrical. That is, each pathway from a specific internal port 86 to a specific internal port 88 connects a specific fabric-facing port 67*a* to a specific line-facing port 67*b*, such as, for example, in a symmetrical manner. For example, in this embodiment, the pathway from port #2 of the fabric-facing ports 67*a* leads to port #5 of the line-fabric ports 67*b*, and a pathway from port #2 of the line-fabric ports 67*b* leads to port #5 of the fabric-facing ports 67*a*. Therefore, although FIG. 15 shows the FMs 62 on one side (e.g., left side of page) and the LMs 64 on the other (e.g., right side of page), the symmetry of the internal pathway arrangement 114 allows the FMs 62 and LMs 64 to be reversed.

Figure 16:
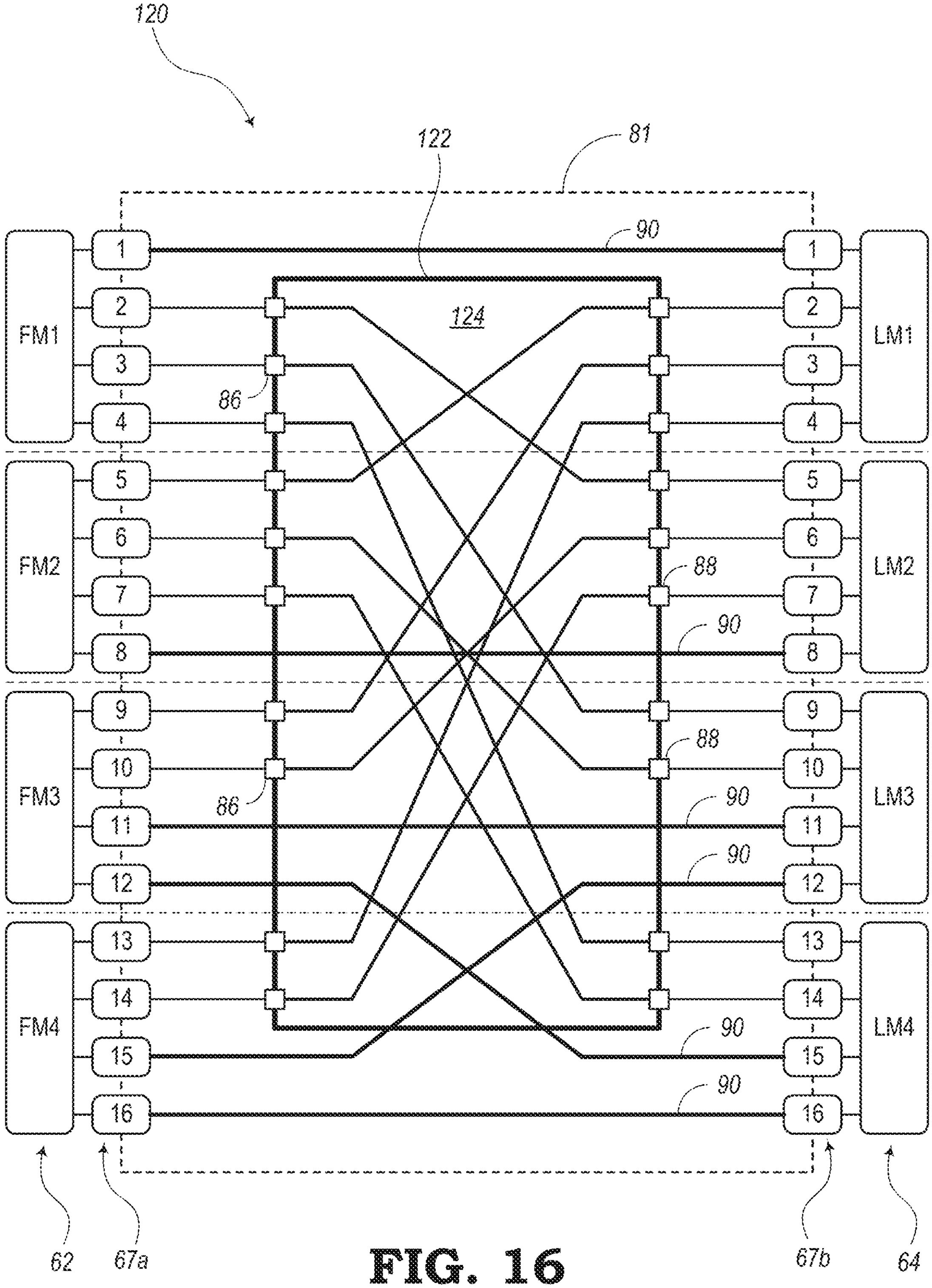
FIG. 16 is a diagram illustrating a FEP having the bypass links shown in FIG. 13 and a cassette module arranged for Stage Six expansion, according to various embodiments.

FIG. 16 is a diagram illustrating an embodiment of a fabric configuration 120 arranged between the plurality of FMs 62 and the plurality of LMs 64. The fabric configuration 120 includes the FEP 81 having the plurality of fabric-facing ports 67*a* and the plurality of line-facing ports 67*b* and is arranged with a CM 122 interconnected between the fabric-facing ports 67*a* and line-facing ports 67*b* configured for Stage Six operation. In this arrangement, the CM 122 includes an internal pathway arrangement 124 where ten pathways are configured to connect these ten specific ports of the first set of internal ports 86 corresponding to ports #2-#7, #9, #10, #13, and #14 of the fabric-facing ports 67*a* associated with the FMs 62 to ten specific ports of the second set of internal ports 88 corresponding to ports #2-#7, #9, #10, #13, and #14 of the line-facing ports 67*b* associated with the LMs 64. In this embodiment, the CM 122, along with the six already existing passthroughs 90, is configured to connect FM1, FM2, FM3, FM4 to LM1, LM2, LM3, LM4 in an equally distributed manner (e.g., where each of the FMs 62 includes a connection to each of the LMs 64, and vice versa). Again, the internal pathway arrangement 124 may have mirror symmetry (i.e., same connections in the FM-to-LM direction as connections in the LM-to-FM direction).

It should be noted that the exact arrangement of passthroughs 90 and pathways of the different CMs 102, 112, 122 are not meant to be limited to the illustrated embodiments, but may include other implementations where Stage Four includes connections from FM1 to LM1 in any configuration, Stage Five includes connections from FM1, FM2 to LM1, LM2 in any equally-distributed configuration, and Stage Six includes connections from FM1, FM2, FM3, FM4 to LM1, LM2, LM3, LM4 in any equally-distributed configuration.

Dual CMs, Singular Replacement for Enabling Scaling

Figure 17:
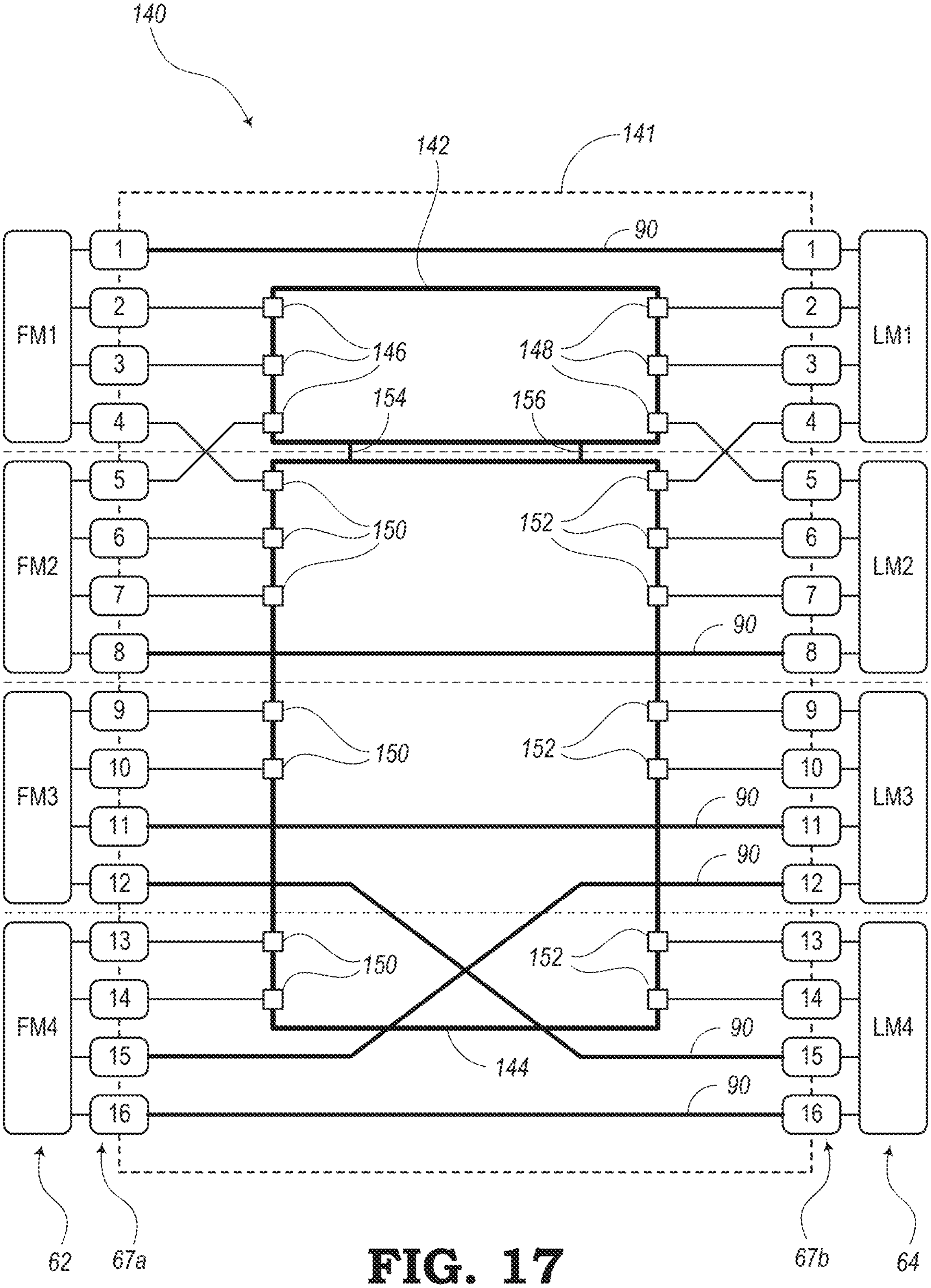
FIG. 17 is a diagram illustrating a FEP having the bypass links shown in FIG. 13 and templates of two cassette modules arranged between fabric modules and line modules enabling scaling of an NE or node, according to various embodiments of the present disclosure.

FIG. 17 is a diagram illustrating an embodiment of a fabric configuration 140 arranged between the plurality of FMs 62 and the plurality of LMs 64. The fabric configuration 140 includes an FEP 141 having the plurality of fabric-facing ports 67*a* and the plurality of line-facing ports 67*b*. In this embodiment, the fabric configuration 140 includes first and second Cassette Modules (CMs) 142, 144, which are configured to work together to enable operation in Stage Four, Stage Five, and Stage Six, depending on which combination of the first and second CMs 142, 144 are installed. As shown in FIG. 17, first and second CMs 142, 144 are merely templates showing the same passthroughs 90 as described above with respect to FIGS. 12-16 and where no internal pathways are included.

The first CM 142 is configured for connection with a first set of internal ports 146 and a second set of internal ports 148, whereby the first set of internal ports 146 (from top to bottom) are configured for connection with ports #2, #3, and #5 of the FMs 62, where the inputs from ports #4 and #5 are crossed in the FEP 141. Likewise, the second set of internal ports 148 (from top to bottom) are configured for connection with ports #2, #3, and #5 of the LMs 64, where the inputs from ports #4 and #5 are crossed in the FEP 141. The second CM 144 is configured for connection with a third set of internal ports 150 and a fourth set of internal ports 152, whereby the third set of internal ports 150 (from top to bottom) are configured for connection with ports #4, #6, #7, #9, #10, #13, and #14 of the FMs 62. Likewise, the fourth set of internal ports 152 (from top to bottom) are configured for connection with ports #4, #6, #7, #9, #10, #13, and #14 of the LMs 64.

Again, FIG. 17 shows templates of CMs 142, 144 do not include any internal pathways. However, from this configuration, CMs with specific internal pathways can replace the templates for changing the connectivity between the FMs 62 and LMs 64 accordingly. Therefore, a network operator may use pairs of CMs that are configured for operation at Stage Four, Stage Five, or Stage Six. In addition, the FEP 141 includes connections 154 and 156 that provide pathways from the first CM 142 to the second CM 144 or between other pairs of CMs that may be inserted in these locations.

Figure 18:
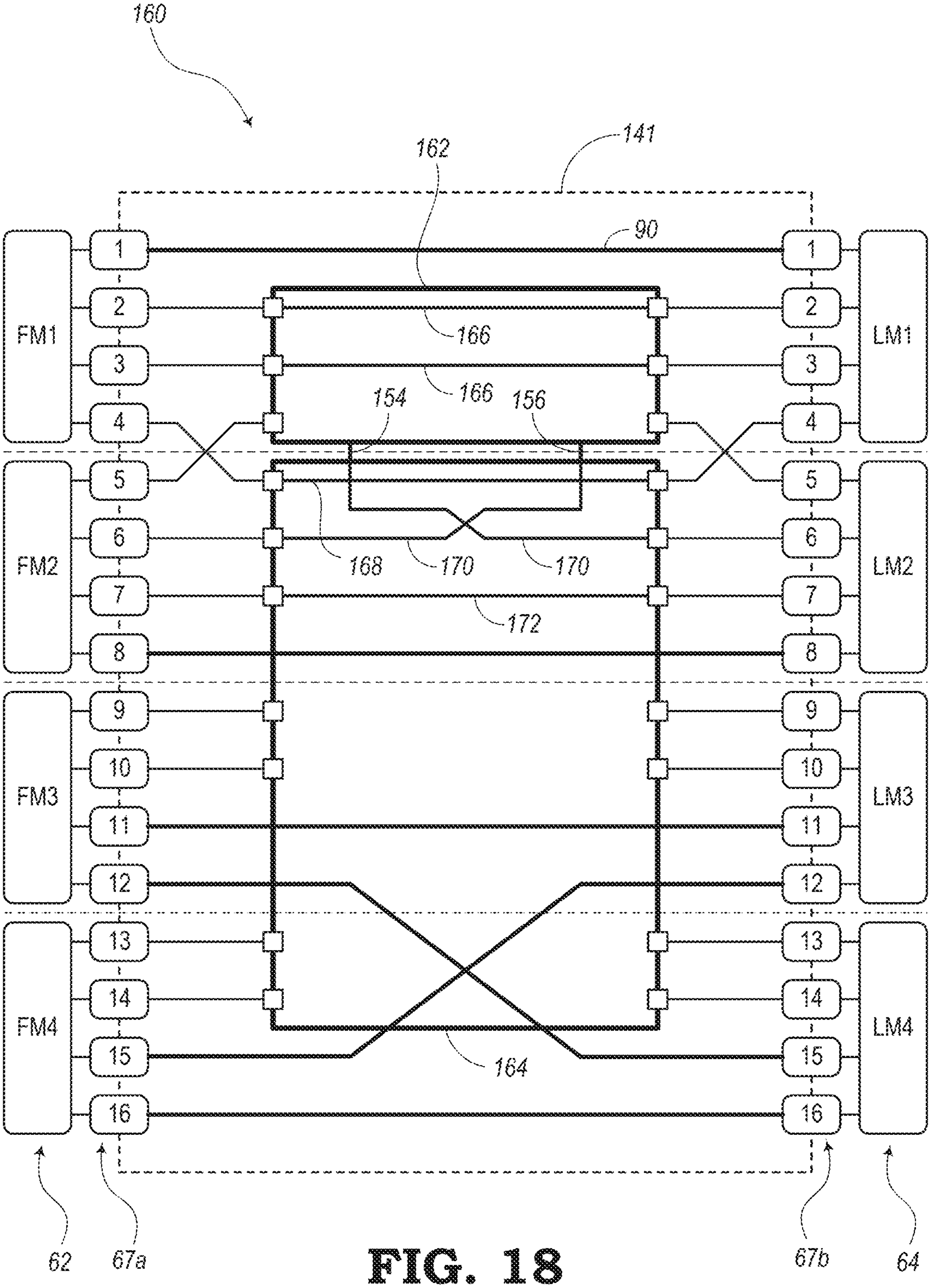
FIG. 18 is a diagram illustrating a FEP having the bypass links shown in FIG. 13 and two cassette modules arranged for Stage Four expansion, according to various embodiments.

FIG. 18 is a diagram illustrating an embodiment of a fabric configuration 160 having two CMs 162, 164 installed for operation in Stage Four. CM 162 includes two pathways 166, and CM 164 includes one pathway 168, whereby these pathways 166, 168 are used for connecting ports #1-#4 of FM1 to ports #1-#4 of LM 1. Although Stage Four does not include the use of FM2, FM3, FM4, LM2, LM3, and LM4, the CM 164 includes pathways 170 connected from FM port #6 to the connection 156 and from LM port #6 to connection 154, but does not complete any link since none is needed at this scale. Also, CM 164 includes another pathway 172 that connects the FM port #7 to LM port #7. The reason for the pathways 170, 172 is that expansion to Stage Five (described below with respect to FIG. 19) makes use of this interconnection arrangement, whereby the CM 164 does not need to be replaced for scaling from Stage Four to Stage Five.

Figure 19:
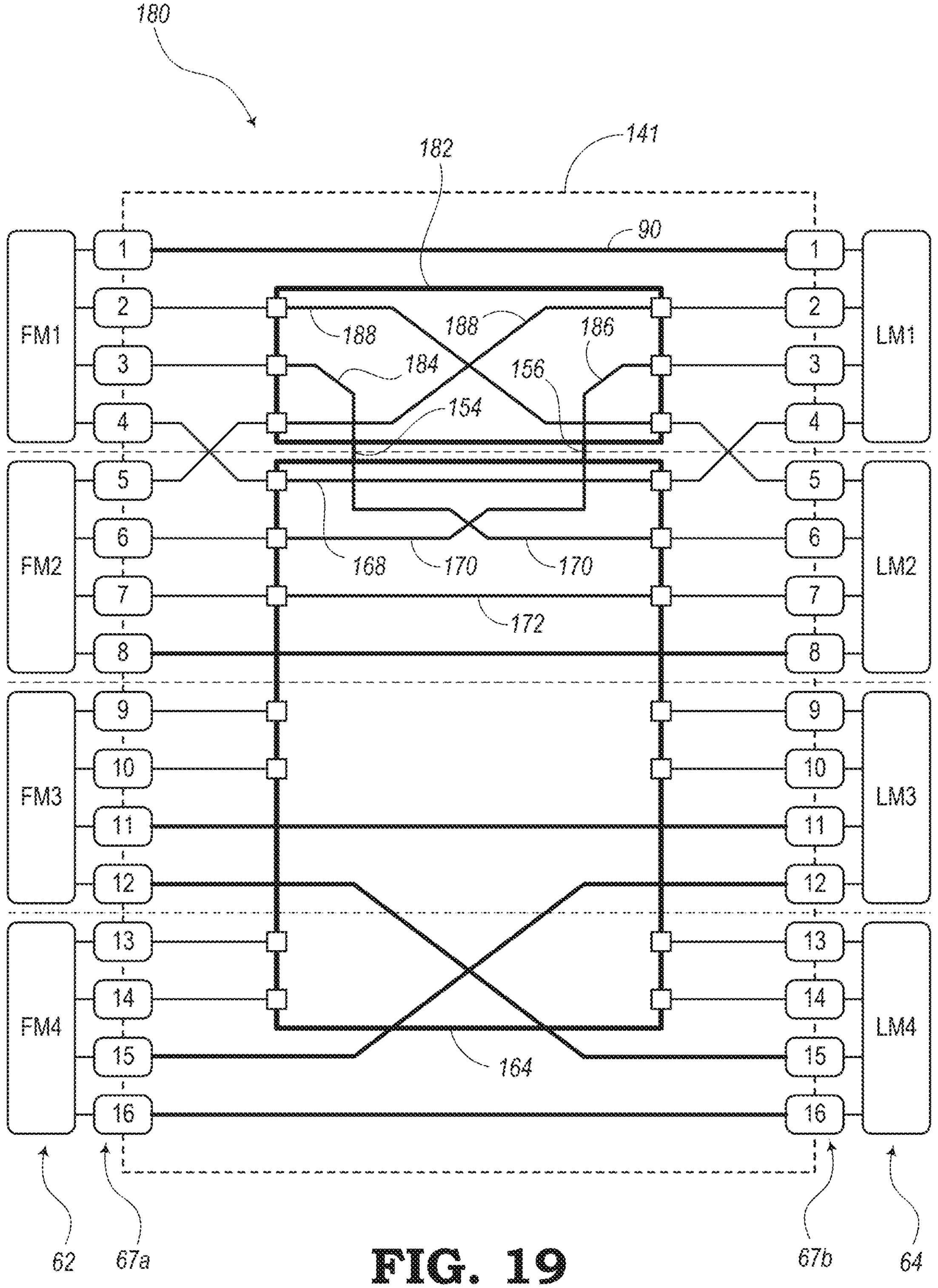
FIG. 19 is a diagram illustrating a FEP having the bypass links shown in FIG. 13 and two cassette modules arranged for Stage Five expansion, whereby the second cassette module shown in FIG. 18 remains the same and only the first cassette module is replaced, according to various embodiments.

FIG. 19 is a diagram illustrating an embodiment of a fabric configuration 180 having two CMs for operation in Stage Five. In this embodiment, CM 164 remains the same as the previous scale level (Stage Four shown in FIG. 18). However, the fabric configuration 180 includes the replacement of CM 162 shown in FIG. 18 with a new CM 182. Specifically, the pathways 168, 170, 172 of the CM 164 remain in place. The new CM 182 includes a pathway 184 connected from FM port #3 to the connection 154 leading to the other CM (i.e., CM 164) and further connected to pathway 170 to LM port #6. The new CM 182 also includes a pathway 186 connected from LM port #3 to the connection 156 leading to the other CM and further connected to pathway 170 to FM port #6. Furthermore, the new CM 182 includes pathways 188 connecting port #2 on one side to port #5 on the other. In this configuration, the NE can operate in the scaled level of Stage Five. It may be noted that the pathway arrangements are configured to equally distribute connections from FM1 to two ports associated with LM1 and two ports associated with LM2 and equally distribute connections from FM2 to two ports associated with LM1 and two ports associated with LM2. When expansion is needed (as described with respect to FIG. 20 below), the new CM 182 can remain connected while the CM 164 can be replaced.

Figure 20:
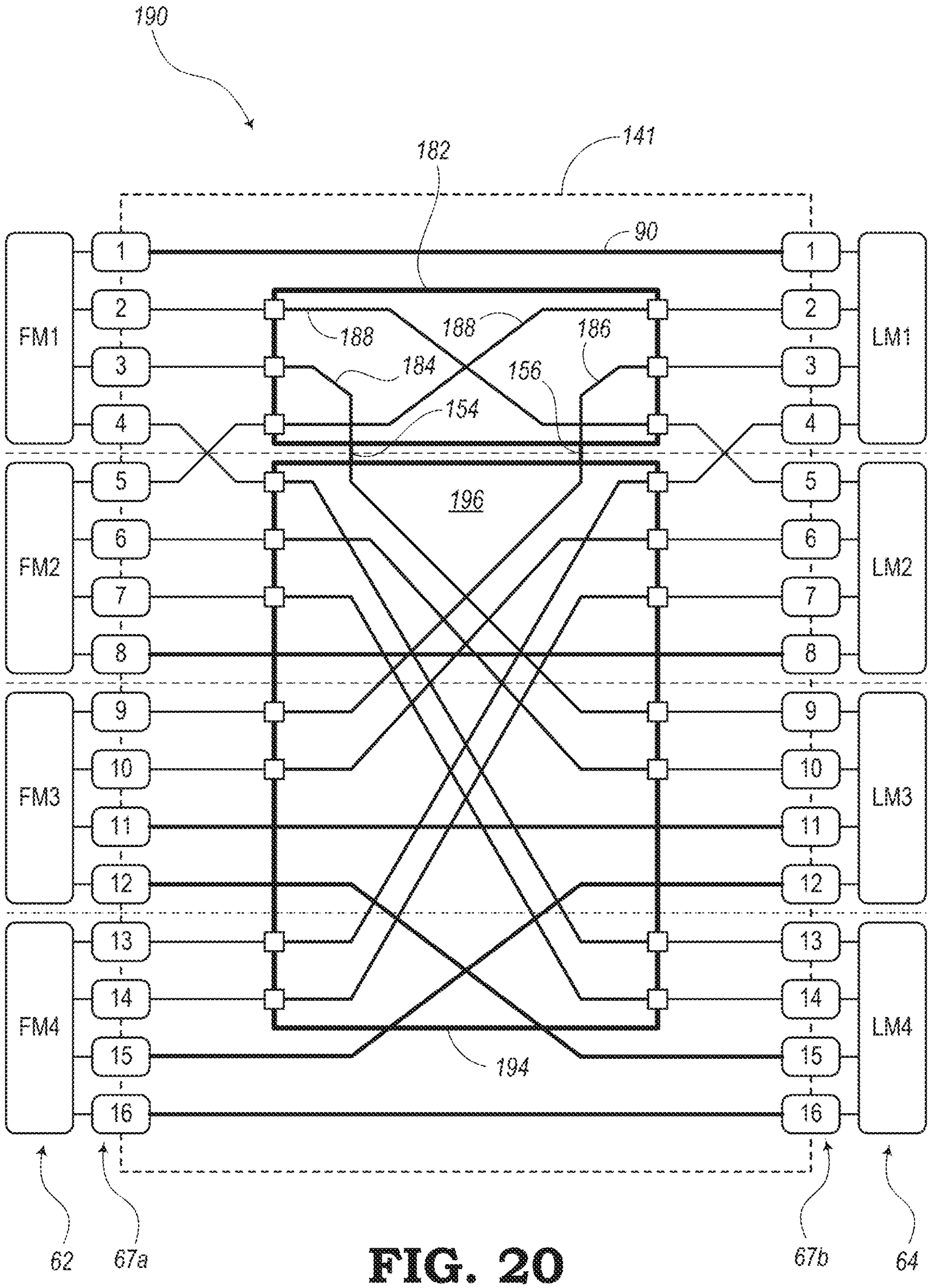
FIG. 20 is a diagram illustrating a FEP having the bypass links shown in FIG. 13 and two cassette modules arranged for Stage Six expansion, whereby the first cassette module shown in FIG. 19 remains the same and only the second cassette module is replaced, according to various embodiments.

FIG. 20 is a diagram illustrating an embodiment of a fabric configuration 190 having two CMs for operation at Stage Six. Again, the CM 182 (previously added for Stage Five) remains intact, while the network operator or technician can replace the CM 164 (used for Stage Four and Stage Five) with a new CM 194. The newly replaced CM 194 includes an internal pathway arrangement 196. With the passthroughs 90, first CM 182, and second CM 194, the fabric configuration 190 as shown is configured to utilize all the fabric-facing ports 67*a* for connection to FM1, FM2, FM3, and FM4 and to utilize all the line-facing ports 67*b* for connection to LM1, LM2, LM3, and LM4 in an equally distributed manner where each FM 62 connects to each LM, and vice versa.

Therefore, according to various embodiments of the present disclosure, scalable fabric assemblies may be incorporated in Network Elements (NEs). In one implementation, a scalable fabric assembly may include multiple fabric modules (e.g., FMs 12, 22, 42, 62), where each fabric module has multiple ports. The scalable fabric assembly further include multiple line modules (e.g., LMs 14, 24, 44, 64), where each line module has a first set of ports configured for connection with each of the multiple fabric modules and a second set of ports configured for connection with client equipment. Furthermore, the scalable fabric assembly includes multiple Fabric Expansion Panels (FEPs) (e.g., FEPs 26, 46, 66) connected to the multiple ports of each of the multiple fabric modules via a first set of cables and connected to the first set of ports of each of the multiple line modules via a second set of cables. As described herein, a scale of Stage One includes a number X of fabric modules (e.g., five) and up to a number Y of line modules (e.g., eight). The multiple FEPs enable the NE to scale beyond Stage One without re-cabling the first and second sets of cables.

According to some embodiments, the scalable fabric assembly may reach a scale of Stage Two that includes 2*X fabric modules and up to 2*Y line modules. Also, a scale of Stage Three may be defined as the scalable fabric assembly having 4*X fabric modules and up to 4*Y line modules. The multiple FEPs may be configured to equally distribute the second set of ports of each of the multiple line modules to the multiple fabric modules at each of Stage One, Stage Two, and Stage Three. The number of line modules (up to the number Y) remains connected to the multiple FEPs via the second set of cables during scaling from Stage One to Stage Two. Also, a group of up to 2*Y line modules remains connected to the multiple FEPs via the second set of cables during scaling from Stage Two to Stage Three.

Moreover, the scalable fabric assembly may be configured whereby each of the multiple FEPs includes one or more replaceable cassettes enabling the NE to scale beyond Stage Three without re-cabling the first and second sets of cables. For example, a scale of Stage Four includes 8*X fabric modules and up to 8*Y line modules, a scale of Stage Five includes 16*X fabric modules and up to 16*Y line modules, and a scale of Stage Six includes 32*X fabric modules and up to 32*Y line modules. The multiple FEPs and replaceable cassettes are configured to enable the NE to scale from Stage One up to Stage Six while the NE is actively operating in a communications system and without significantly interrupting traffic during transition. In some embodiments, each of the multiple FEPs may include a first replaceable cassette and a second replaceable cassette, wherein only the first replaceable cassette is replaced while scaling from Stage Four to Stage Five, and wherein only the second replaceable cassette is replaced while scaling from Stage Five to Stage Six.

According to additional embodiments, the scalable fabric assembly may be arranged where X=5, Y=8, each of the five fabric modules includes 32 ports, and the first set of ports of each of the eight line modules includes 20 ports. Also, the line modules may be Quad Small Form-factor Pluggable (QSFP) devices. In addition, the NE may be a network node that includes a disaggregated combination of fabric modules and line modules.

Blind Mate

As described herein, the replaceable cassettes are configured to be field-replaceable to support different fan-outs, i.e., different stages. The CMs are configured to be selectively inserted and removed from the FEP depending on the current need. The CMs include the internal ports that connect with corresponding internal ports in the FEP. Such connectivity can be via blind mating to support ease of configuration. Blind mating allows connectors to be easily mated or connected without the need for the operator to see the connector. This is particularly useful in hard-to-reach places or in situations where multiple connections need to be made quickly and efficiently. Blind mating connectors typically include guide features, such as pins, slots, or rails, that help align the connectors properly as they are brought together. This ensures a correct and secure connection is made without the need for visual inspection or precise alignment by hand.

Scalable Fabric Assembly

In an embodiment, a scalable fabric assembly incorporated in a Network Element (NE) includes a plurality of fabric modules, each fabric module having a plurality of ports; a plurality of line modules, each line module having a first set of ports configured to connect with the plurality of fabric modules and a second set of ports configured to connect with client equipment; and a plurality of Fabric Expansion Panels (FEPs) disposed between the plurality of fabric modules and the plurality of line modules and connected to the plurality of ports of each of the plurality of fabric modules and connected to the first set of ports, wherein each of the plurality of FEPs include internal connectivity that supports fan out between the plurality of fabric modules and the plurality of line modules based on a current stage.

The internal connectivity can be based on one or more cassettes incorporated into each of the plurality of FEPs. The one or more cassettes can be selectively replaceable. To grow from a current stage to a next stage, the internal connectivity can be changed to support the fan out between the plurality of fabric modules and the plurality of line modules based on the next stage, and new fabric modules and new line modules are connected to the plurality of FEPs. The current stage supports a number X of fabric modules and up to a number Y of line modules.

In the current stage, each of the plurality of FEPs can be configured with the internal connectivity to distribute the first set of ports of the plurality of line modules to the plurality of ports of the plurality of fabric modules. In a next stage, the internal connectivity of the plurality of FEPs can be upgraded to redistribute the first set of ports of the plurality of line modules to the plurality of ports of the plurality of fabric modules and a plurality of ports of new fabric modules.

Each of the plurality of line modules can support pluggable optical modules. The NE can be in a disaggregated arrangement for the plurality of fabric modules and the plurality of line modules. The internal connectivity can be based on a plurality of cassettes incorporated into each of the plurality of FEPs. The plurality of cassettes can be selectively replaceable. To upgrade from the current stage to a next stage, one of the plurality of cassettes can be replaced and other of the plurality of cassettes remain, thereby supporting some connectivity during the upgrade.

During an upgrade, the internal connectivity of the plurality of FEPs can be upgraded whereas the plurality of ports of each of the plurality of fabric modules and the first set of ports remain unchanged on the plurality of FEPs. During initial deployment, the plurality of FEPs can be deployed based on a final configuration of the NE. The internal connectivity of the FEPs can be based on one or more cassettes that are selectively replaceable to move to double a size from the current stage. The internal connectivity can include optical cables.

Disaggregated Network Element

In another embodiment, a disaggregated network element includes N fabric modules, each fabric module having a plurality of ports; M line modules, each line module having a first set of ports configured to connect with the plurality of fabric modules and a second set of ports configured to connect with client equipment; and a set of Fabric Expansion Panels (FEPs) disposed between the N fabric modules and the M line modules, wherein each of the plurality of FEPs include internal connectivity that supports fan out between the N fabric modules and the M line modules based on a current stage. Note, N and M are integers and may or may not be the same value.

The internal connectivity can be based on a plurality of cassettes incorporated into each of the set of FEPs. To upgrade from the current stage to a next stage, one of the plurality of cassettes can be replaced and other of the plurality of cassettes remain, thereby supporting some connectivity during the upgrade.

Process

Figure 21:
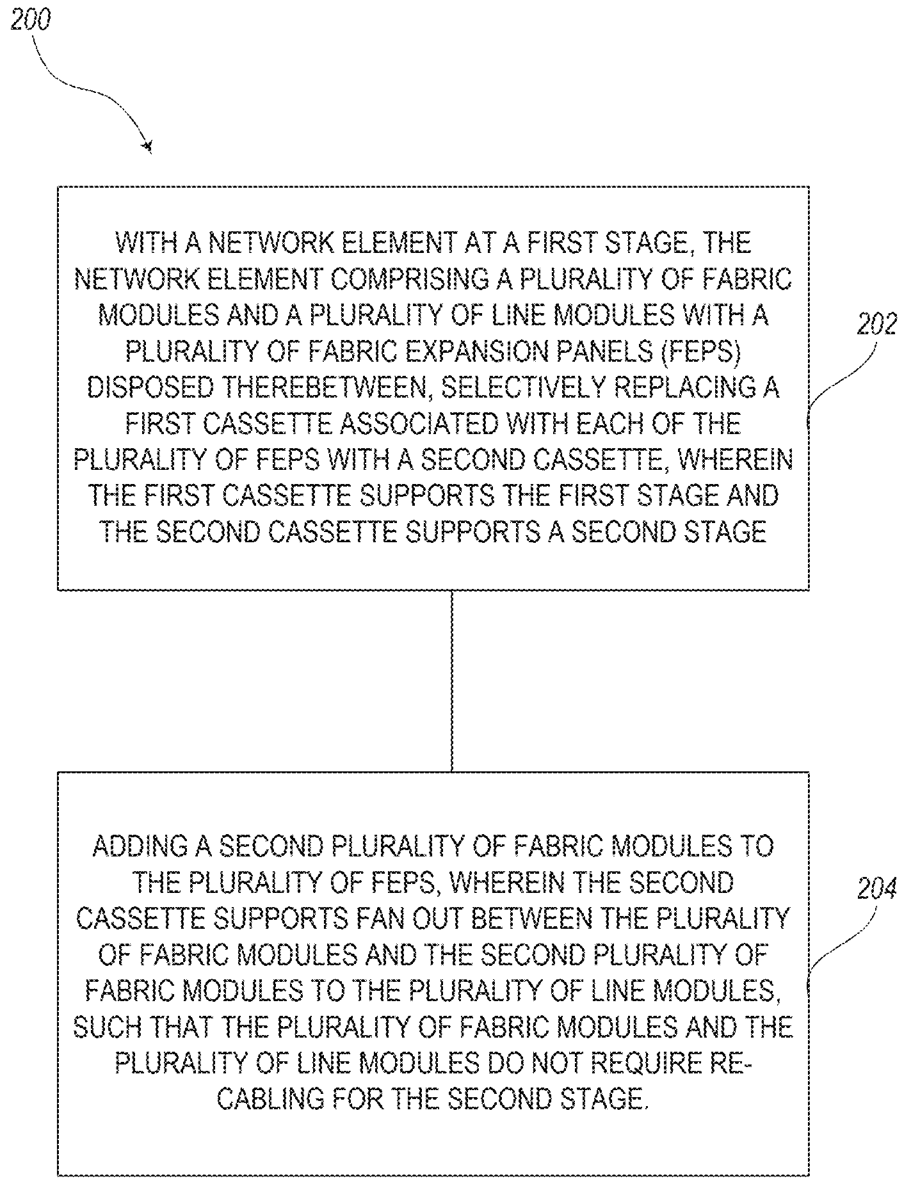
FIG. 21 is a flowchart of a process for upgrading a network element, according to various embodiments.

FIG. 21 is a flowchart of a process 200 for upgrading a network element based on the present disclosure. The process 200 includes, with a network element at a first stage, the network element comprising a plurality of fabric modules and a plurality of line modules with a plurality of Fabric Expansion Panels (FEPs) disposed therebetween, selectively replacing a first cassette associated with each of the plurality of FEPs with a second cassette, wherein the first cassette supports the first stage and the second cassette supports a second stage (step 202); and adding a second plurality of fabric modules to the plurality of FEPs, wherein the second cassette supports fan out between the plurality of fabric modules and the second plurality of fabric modules to the plurality of line modules, such that the plurality of fabric modules and the plurality of line modules do not require re-cabling for the second stage (step 204).

Additional Aspects

Thus, according to various implementations, a disaggregated router system may be installed at a field site with all required fabric modules for a specific size system (e.g., Stage One). A certain number of FEPs to support all levels of future expansion for the deployed system are also initially installed. The FEPs may be deployed with replaceable cassettes. The starting number of LM (or I/O modules) may be installed to support the required services. Additional LMs may be installed over time within the Stage One operation until the fabric capacity is fully utilized.

Then, fabric expansion is initiated by adding another equal number of fabric modules to the system when system growth is required. The new fabric modules are added to enable Stage Two operation and are connected to the unused FEPs expansion ports. Also, FEP replaceable cassettes may be swapped out with next level cassettes. At this point, additional LM may be added to the system as needed and cabled to the FEP expansion ports until the Stage Two fabric capacity is fully utilized. Fabric capacity can then be doubled again depending on the limits of the FM and LM connectivity as well as the design limitations of the FEP in use.

As such, disaggregated systems may be deployed, where fabric interconnect is not made directly between fabric and line modules, but are instead connected to another device, where that device is not an OCS. For example, the fabric assemblies and systems are configured to provide a solution to customers of various network equipment (e.g., NE, switch, router, etc.), where the customers may desire the ability to scale the size of installed systems in a simple way that does not require re-cabling or the use of more expensive OCSs.

In some embodiments, there may be 1, 2, or 4 FMs per Fabric Group (FG) dependent on expansion level. With five FMs (one per FG), each LM connects four fabric ports to each FM (i.e., 4 QSFP-DDs×8 LMs=32 FM ports). With ten FMs (two per FG), each LM connects two fabric ports to each FM (i.e., 2 QSFP-DDs×16 LMs=32 FM ports). With 20 FMs (four per FG), each LM connects one fabric port to each FM (i.e., 1 QSFP-DD×32 LMs=32 FM ports).

For each Fabric Cluster (FC), there may be 8 FMs and 32 FEPs. For example, 40 FMs=5 FCs, where each LM connects 4 fabric ports to each cluster (i.e., 4 QSFP-DDs×64 LMs=256 FC ports). For example, 80 FMs=10 FC, where each LM connects 2 fabric ports to each cluster (i.e., 2 QSFP-DDs×128 LM=256 FC ports). Also, 160 FMs=20 FCs, where each LM connects 1 fabric port to each cluster (i.e., 1 QSFP-DD×256 LM=256 FC ports).

Regarding fabric bandwidth, all FEPs in a single x8 array may be within a fabric group. FEP cassette replacement may affect only one fabric group. With 4 fabric groups, the upgrade process may include a situation where the ports are always connected, 16 of 20 LM ports are not affected during cassette replacement. If all FEP ports connected to a cassette, then all 4 LM fabric ports would be disconnected. This would result in 16 of the 20 ports being connected. Bypassing the 6 ports around the cassette means that 17 of 20 LM fabric ports remain connected, where there is 1 port in the FEP under cassette replacement. Also, if the FEP is designed with two cassettes instead of one, 18 of 20 LM fabric ports may remain connected, where there are 2 ports in the FEP under cassette replacement.

To expand from 5 to 10 to 20 FMs, a network operator or technician may proceed as follows:

(a) Install an additional 5 or 10 FMs (i.e., add 1 FM, then 2 FMs) to each of the 5 fabric groups FGs.
(b) Make fiber connections between added FMs and expansion ports of existing FEPs. Existing FEP connecting to port 1 to 4 of FMs should be connected to port 1 to 4 of new FMs using FEP expansion ports, and so on for all FEPs across the FM.
(c) Repeat the above connections for all 5 fabric groups.
(d) One at a time, replace the fixed Cassette Modules (CMs) of each of 40 FEPs for the next stage of fixed CMs.
(e) Add additional LMs and cable 4 fabric port groups to the 5 fabric group to the expansion ports of the FEPs.

To expand from 20 to 40 FMs, a network operator or technician may proceed as follows:

(a) Add 4 FMs to each of 5 fabric groups so that each fabric group has 8 FMs to form a cluster for each fabric group.
(b) Install 32 CMs to each of 5 fabric groups.
(c) Install an additional 56 FEPs per 5 fabric groups so that the total FEPs per group increases from 8 to 64.
(d) Starting in FG1, for FM1, FM6, FM11, FM16, remove ports 1 to 4 connections from FEP1 and move these connections to between FEPs & CMs.
(e) FEP1 should connect to CM1 port 1, FEP2 to FEM1 port 2, etc.
(f) Connect CM 1 port 1 to FM port 1. Make connections between CM1 ports 2 to 8 to FM2 to FM8 port 1 respectfully.
(g) Repeat for other FM 3 ports.
(h) Repeat for all FM ports in the fabric group.
(i) Replace FEP fixed CMs from 3 level CMs with level 1 CMs.
(j) Repeat for all Fabric groups.
(k) Add all the connections for new FEPs and CMs and freed up FM ports.
(l) Re-cable on FEP at a time—all LM connections from FEP expansion ports to L1 ports on the additional FEPs that we added.

(m) Install and cable new 32 LMs as required to L1 ports of FEPs that were added at this stage.

To expand from 40 to 80 to 160 FMs, the network operator or technician may perform the following:

(a) Install additional 5 or 10 FCs (fabric clusters x8 FMs), that is 1 or 2 FCs to each of 5 fabric groups FGs. Total additional 40 or 80 FMs.
(b) Install additional 32 or 64 CMs per 6 fabric groups, 32 CMs per FC.
(c) Make connections between each FM port of new FCs and the new CMs.
(d) Make fiber connections between added CMs and expansion ports of existing FEPs. Add CM connections to FEPs should line up with the other existing CMs from other clusters in the group.
(e) Repeat above connections for all 5 fabric groups.
(f) One at a time, replace the fixed CM of each of 320 FEPs for the next stage fixed CM.
(g) Add additional LMs and cable 4 fabric port groups to the 5 fabric group to the expansion ports of the FEPs.

CONCLUSION

Of note, the various descriptions herein are presented for illustration purposes and those skilled in the art will recognize there can be various implementations. For example, QSFP-DD modules can be replaced with other types of modules. Also, the stages described herein are also presented for illustration purposes to show the operation and benefits of the FEPs. Those skilled in the art will recognize various different stages are contemplated consistent with the present disclosure and all of which are contemplated herewith.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A scalable fabric assembly incorporated in a Network Element (NE), the scalable fabric assembly comprising:

a plurality of fabric modules, each fabric module having a plurality of ports;

a plurality of line modules, each line module having a first set of ports configured to connect with the plurality of fabric modules and a second set of ports configured to connect with client equipment; and a plurality of Fabric Expansion Panels (FEPs) disposed between the plurality of fabric modules and the plurality of line modules and connected to the plurality of ports of each of the plurality of fabric modules and connected to the first set of ports, wherein each of the plurality of FEPs includes internal connectivity that supports fan out between the plurality of fabric modules and the plurality of line modules based on a current stage.

2. The scalable fabric assembly of claim 1, wherein the internal connectivity is based on one or more cassettes incorporated into each of the plurality of FEPs.

3. The scalable fabric assembly of claim 2, wherein the one or more cassettes are selectively replaceable.

4. The scalable fabric assembly of claim 1, wherein, to grow from a current stage to a next stage, the internal connectivity is changed to support the fan out between the plurality of fabric modules and the plurality of line modules based on the next stage, and new fabric modules and new line modules are connected to the plurality of FEPs.

5. The scalable fabric assembly of claim 1, wherein the current stage supports a number X of fabric modules and up to a number Y of line modules.

6. The scalable fabric assembly of claim 1, wherein, in the current stage, each of the plurality of FEPs are configured with the internal connectivity to distribute the first set of ports of the plurality of line modules to the plurality of ports of the plurality of fabric modules.

7. The scalable fabric assembly of claim 6, wherein, in a next stage, the internal connectivity of the plurality of FEPs is upgraded to redistribute the first set of ports of the plurality of line modules to the plurality of ports of the plurality of fabric modules and a plurality of ports of new fabric modules.

8. The scalable fabric assembly of claim 1, wherein each of the plurality of line modules support pluggable optical modules.

9. The scalable fabric assembly of claim 1, wherein the NE is in a disaggregated arrangement for the plurality of fabric modules and the plurality of line modules.

10. The scalable fabric assembly of claim 1, wherein the internal connectivity is based on a plurality of cassettes incorporated into each of the plurality of FEPs.

11. The scalable fabric assembly of claim 10, wherein the plurality of cassettes are selectively replaceable.

12. The scalable fabric assembly of claim 10, wherein, to upgrade from the current stage to a next stage, one of the plurality of cassettes is replaced and other of the plurality of cassettes remain, thereby supporting some connectivity during the upgrade.

13. The scalable fabric assembly of claim 1, wherein, during an upgrade, the internal connectivity of the plurality of FEPs is upgraded whereas the plurality of ports of each of the plurality of fabric modules and the first set of ports remain unchanged on the plurality of FEPs.

14. The scalable fabric assembly of claim 1, wherein, during initial deployment, the plurality of FEPs are deployed based on a final configuration of the NE.

15. The scalable fabric assembly of claim 14, wherein the internal connectivity of the FEPs is based on one or more cassettes that are selectively replaceable to move to double a size from the current stage.

16. The scalable fabric assembly of claim 1, wherein the internal connectivity includes optical cables.

17. A disaggregated network element comprising:

N fabric modules, each fabric module having a plurality of ports;

M line modules, each line module having a first set of ports configured to connect with the plurality of fabric modules and a second set of ports configured to connect with client equipment; and a set of Fabric Expansion Panels (FEPs) disposed between the N fabric modules and the M line modules, wherein each of the plurality of FEPs includes internal connectivity that supports fan out between the N fabric modules and the M line modules based on a current stage.

18. The disaggregated network element of claim 17, wherein the internal connectivity is based on a plurality of cassettes incorporated into each of the set of FEPs.

19. A Fabric Expansion Panel (FEP) comprising:

a housing comprising a plurality of fabric-facing ports and a plurality of line-facing ports;

internal ports communicatively coupled to the plurality of fabric-facing ports and the plurality of line-facing ports; and one or more cassettes selectively insertable into the housing and configured to blind mate to the internal ports, wherein each of the one or more cassettes include fan out between a plurality of fabric modules and a plurality of line modules, via the internal ports, based on a current stage.

20. The FEP of claim 19, wherein the one or more cassettes are based on a plurality of stages, with each stage of the plurality of stages having a specific fan out based thereon.

* * * * *